(12) United States Patent
Torkelson et al.

(10) Patent No.: US 12,204,884 B2
(45) Date of Patent: Jan. 21, 2025

(54) METHOD AND SYSTEM FOR MANAGING UNIFICATION OF PLURALITY OF CONCURRENT ACTIVITIES IN A COMPUTING ENVIRONMENT

(71) Applicant: AKC's Product Holding Company, L.L.C., Tulsa, OK (US)

(72) Inventors: Jonathan Torkelson, Tulsa, OK (US); Devender Nath Maurya, Madanpur Khadar (IN); Nicholas Wesley Vinyard, Tulsa, OK (US)

(73) Assignee: AKC's Product Holding Company, L.L.C., Tulsa, OK (US)

( * ) Notice: Subject to any disclaimer, the term of this patent is extended or adjusted under 35 U.S.C. 154(b) by 0 days.

(21) Appl. No.: 17/986,630

(22) Filed: Nov. 14, 2022

(65) Prior Publication Data
US 2023/0153092 A1 May 18, 2023

Related U.S. Application Data

(60) Provisional application No. 63/278,618, filed on Nov. 12, 2021.

(51) Int. Cl.
*G06F 9/44* (2018.01)
*G06F 8/61* (2018.01)
*G06F 8/71* (2018.01)

(52) U.S. Cl.
CPC . *G06F 8/61* (2013.01); *G06F 8/71* (2013.01)

(58) Field of Classification Search
None
See application file for complete search history.

(56) References Cited

U.S. PATENT DOCUMENTS

| 9,043,747 | B2 | 5/2015 | Eksten et al. |
| 9,256,425 | B2 | 2/2016 | Baird et al. |
| 10,671,384 | B1 | 6/2020 | Boynes |
| | | (Continued) | |

OTHER PUBLICATIONS

CN 113010204, English text (Year: 2021).*

*Primary Examiner* — Insun Kang
(74) *Attorney, Agent, or Firm* — GableGotwals; David G. Woodral

(57) ABSTRACT

A method and system for managing unification of plurality of concurrent activities in computing environment is disclosed. Method includes receiving request from user to modify computing environment and retrieving set of available versions of packages associated with existing activity or new activity, from package source database, based on receiving request. Method includes analyzing iteratively homogenous and heterogenous dependencies for retrieved set of available versions of the packages, using semantic versioning. Method includes determining acceptable versions of packages, upon analyzing. Further, method includes generating dependency graphs for the acceptable versions of the packages. Furthermore, method includes performing unification of acceptable versions of the packages based on dependency graphs. Method includes generating a set of recommendations to acquire required licenses or resolve other policy requirements, and installing the final unified version of the packages into an installation target location which is independent of other installation target locations, based on acquiring required licenses.

21 Claims, 9 Drawing Sheets

(56) References Cited

U.S. PATENT DOCUMENTS

| | | | |
|---|---|---|---|
| 10,678,513 B2* | 6/2020 | Kadam | G06F 9/44521 |
| 2005/0011826 A1 | 8/2005 | Miller et al. | |
| 2017/0371649 A1* | 12/2017 | Li | G06F 8/71 |
| 2018/0219972 A1* | 8/2018 | Vintzel | G06F 8/61 |
| 2019/0392070 A1 | 12/2019 | Johnson et al. | |
| 2020/0004528 A1* | 1/2020 | Pape | G06F 8/65 |
| 2020/0257516 A1* | 8/2020 | Totale | G06F 8/71 |
| 2021/0117548 A1 | 4/2021 | Gokhman et al. | |
| 2021/0397426 A1* | 12/2021 | Du | G06F 8/61 |

* cited by examiner

METHOD AND SYSTEM FOR MANAGING UNIFICATION OF PLURALITY OF CONCURRENT ACTIVITIES IN A COMPUTING ENVIRONMENT

CROSS-REFERENCE TO RELATED CASES

This application claims the benefit of U.S. provisional patent application Ser. No. 63/278,618, filed on Nov. 12, 2021, and incorporates such provisional application by reference into this disclosure as if fully set out at this point.

FIELD OF THE INVENTION

The embodiments of the present disclosure generally relate to computer data systems. More particularly, the present disclosure relates to a method and a system for managing unification of plurality of concurrent activities in a computing environment. Managing unification may include analyzing homogenous and heterogenous dependencies for available versions of packages, generating dependency graphs, performing unification of acceptable versions of packages, determining policies and claim requirements, determining rights deficiency, and installing a final unified version of the packages into an installation target location which is independent of other installation target locations.

BACKGROUND OF THE INVENTION

The following description of related art is intended to provide background information pertaining to the field of the disclosure. This section may include certain aspects of the art that may be related to various features of the present disclosure. However, it should be appreciated that this section is to be used only to enhance the understanding of the reader with respect to the present disclosure, and not as admissions of prior art.

Applications or software programs are commonly conceptualized as monolithic applications/software programs such as word processing applications or spreadsheet applications, which may be used and then closed. Some complex operations, like managing a business or managing a power distribution grid, require the use of multiple monolithic and independently developed applications that may not be specifically designed to interoperate seamlessly with each other. When this is the case, human factors problems often occur due to the operators having to use multiple separate applications. The term "stovepipe software" may be used to describe this problem of non-interoperable software being combined together to support an operation.

Stovepipe software applications may be provided for free or licensed according to an agreement. Further, software vendors may accept payment for paid licenses and may enforce the software license to ensure the software is not used incorrectly or without authorization. In addition, software vendors may distribute the software and may include associated documentation to support customers. Software vendors may distribute either monolithic applications/software programs or individual software libraries, which provide specific capabilities that can be compiled and built into a monolithic application. The software libraries may be licensed or provided for free. The software libraries may be in the form of source code or precompiled libraries that are statically or dynamically linked with the monolithic application.

Both monolithic software applications and software libraries may be valid software packages, and references to "software package" may refer to either a monolithic software application or a software library. The "packages" which may be software articles or simply content such as images, video, or other digital payload which needs to be installed into some "installation target", which may require proper deployment and installation of packages. The packages may have dependencies on other packages, thus package dependencies must be properly installed for the root package to be considered properly installed. A software library package depending on another software library package may be an implied compile-time dependency, that is, the dependency must be satisfied at the time the derivative monolithic software application is built. These monolithic applications may be built using software tools which can include build system generator tools and build system tools such as compilers, integrated development environments, and more. The goal of adding a software library package and its dependencies to a project is to correctly build the project. The act of correctly building an application also requires the build system generator and build system tools to be properly installed, thus the build system generator and build system tools may also be considered software packages.

As software technologies and workflows continue to advance in sophistication and complexity, the time involved in properly setting up and reproducing a build may also continue to grow and may require specialized understanding. Thus, discussions relating to software packages may need to be understood to refer to both software library packages and monolithic software application packages, which may be part of a build system or may be any normal software application. Additionally, a "software package" may be a more special class of the generic "packages." The package management may be a digital payload that must be notionally "installed" somewhere, irrespective of whether the payload relates to software or content. The process of installing packages to installation targets is understood to vary widely based on the package being installed and the installation target to which the package is being installed.

Packages may change over time, as the development of the package continues and may depend on other packages for proper function. Each version of the package may have dependencies on ranges of versions of other packages. The packages may involve different specifications which may vary from package to package and which must function properly when installed into an installation target. According to defined license agreements or other policies, the package vendors may wish to control usage of the packages. Policies dictate how packages can be used from the supply or vendor side. Further, the package organizational users may wish to control how its members install and use packages according to defined policies. These policies dictate how packages can be used on the consumption side, to protect the organization using the packages, for example.

A composable software architecture may involve a single unified solution created from software libraries and products which form complex dependencies on other software libraries and products. As the demand for this power and flexibility grows, the challenge of increasing complexity also grows for issues such as software licensing, consolidated pricing for composable software solutions, software package management, scalability, payment facilitation, customer support, package metrics, and so on. Conventional software licensing solutions may focus on individual software vendors of monolithic applications; however, the conventional software licensing solution may not provide any solutions in the context of ecosystems of software solutions composed by complex software package dependencies (a dependency graph).

A so-called "no-code" software development platform can allow applications to be rapidly developed without requiring programmer expertise. In this ideal platform, users express design intent without needing any understanding of the code needed to implement the application, or the build system tools that need to be installed to support the application. Adding a no-code functionality in general may involve licensed installation of packages into a project as well as proper installation of any needed build system generators and build systems. For a no-code user, adding functionality to an application may involve resolution of a complex graph of packages from multiple authors, each having licensing requirements which all must be jointly satisfied to accomplish the user's intent.

In order for such an improvement in production economy, there is, therefore, a need of a robust, improved and flexible method and system for managing unification of plurality of concurrent activities in a computing environment, which creates solutions that involve both hardware and software components as unified compositions of hardware, software libraries, and build system packages.

SUMMARY OF THE INVENTION

This section is provided to introduce certain concepts and aspects of the present invention in a simplified form that are further described below in the detailed description. This summary is not intended to identify the key features or the scope of the claimed subject matter.

In an embodiment, the present disclosure may include a method for managing unification of plurality of concurrent activities in a computing environment. The method includes receiving a request from a user to modify a computing environment. The request comprises at least one of, a root installation request for a package associated with an existing activity in the computing environment or a plurality of root installation requests associated with a new activity in the computing environment. Further, the method includes retrieving a set of available versions of one or more packages associated with at least one of the existing activity or the new activity, from one or more package source database, based on receiving the request. Furthermore, the method includes analyzing iteratively one or more homogenous dependencies and one or more heterogenous dependencies for the retrieved set of available versions of the one or more packages, using semantic versioning. Thereafter, the method includes determining one or more acceptable versions of the one or more packages, upon analyzing the one or more homogenous dependencies and one or more heterogenous dependencies for the retrieved set of available versions. The one or more acceptable versions are determined based on analyzing one or more dependency notations associated with the one or more packages and determining one or more final versions to be installed from one or more acceptable versions of the one or more packages, from the analyzed one or more dependency notations. Further, the method includes generating one or more dependency graphs for the one or more acceptable versions of the one or more packages. Generating the one or more dependency graphs includes forming one or more product dependency graphs and one or more package dependency graphs to use one or more packages associated with at least one of the existing activity or the new activity. Furthermore, the method includes performing unification of the one or more acceptable versions of the one or more packages based on the one or more dependency graphs. A final unified version of the one or more packages is selected based on analyzing one or more primary ordinal directions and one or more subordinal directions of dependencies associated with the one or more acceptable versions of the one or more packages. Thereafter, the method includes determining one or more policies and claim requirements for the one or more policies associated with the final unified version of the one or more packages, upon performing unification of the one or more acceptable versions of the one or more packages. The unification of the one or more acceptable versions of the one or more packages is not affected by deficiencies in the one or more policies. Also, the method includes activating one or more packages in the final unified version, when a claim grant for the one or more policies is obtained. Further, the method includes determining rights deficiency for the final unified version to validate licensing requirements associated with the unified version based on a given policy. Furthermore, the method includes generating a set of recommendations to acquire required licenses for the one or more packages, when the validated licensing requirements associated with the final unified version is not satisfied. Thereafter, the method includes installing the final unified version of the one or more packages into an installation target location which is independent of other installation target locations, based on acquiring the required licenses. Each of the installation target locations are independent with respect to one or more packages installed into the each of the installation target locations.

In another embodiment, the present disclosure may further include a system for managing unification of plurality of concurrent activities in a computing environment. The system receives a request from a user to modify a computing environment. The request includes at least one of, a root installation request for a package associated with an existing activity in the computing environment or a plurality of root installation requests associated with a new activity in the computing environment. Further, the system retrieves a set of available versions of one or more packages associated with at least one of the existing activity or the new activity, from one or more package source database, based on receiving the request. Furthermore, the system analyzes iteratively one or more homogenous dependencies and one or more heterogenous dependencies for the retrieved set of available versions of the one or more packages, using semantic versioning. Thereafter, the system determines one or more acceptable versions of the one or more packages, upon analyzing the one or more homogenous dependencies and one or more heterogenous dependencies for the retrieved set of available versions. The one or more acceptable versions are determined based on analyzing one or more dependency notations associated with the one or more packages and determining one or more final versions to be installed from one or more acceptable versions of the one or more packages, from the analyzed one or more dependency notations. Further, the system generates one or more dependency graphs for the one or more acceptable versions of the one or more packages. Generating the one or more dependency graphs includes forming one or more product dependency graphs and one or more package dependency graphs to use one or more packages associated with at least one of the existing activity or the new activity. Furthermore, the system performs unification of the one or more acceptable versions of the one or more packages based on the one or more dependency graphs. A final unified version of the one or more packages is selected based on analyzing one or more primary ordinal directions and one or more subordinal directions of dependencies associated with the one or more acceptable versions of the one or more packages. Thereafter, the system determines one or more policies and claim requirements for the one or more policies associated with the final unified version of the one or more packages, upon performing unification of the one or more acceptable versions of the one or more packages. The unification of the one or more acceptable versions of the one or more packages is not affected by deficiencies in the one or more policies. Also, the system activates one or more packages in the final unified version, when a claim grant for the one or more policies is obtained. Further, the system evaluates policies for the existence of claim deficiencies for the final unified version to validate licensing requirements associated with the unified version based on a given licensing policy. Furthermore, the system presents the user with resolution actions to acquire missing licenses or perform other actions such as accepting license agreements for the one or more packages, when the validated licensing requirements associated with the final unified version is not satisfied. These are just a small number of representative actions that may be needed to resolve license policy requirements. Other actions could include providing date of birth, providing country of origin, indicating whether the organization is a professional or educational/non-commercial entity, and so on. Thereafter, the system installs the final unified version of the one or more packages into an installation target location which is independent of other installation target locations, based on acquiring the required licenses. Each of the installation target locations are independent with respect to one or more packages installed into the each of the installation target locations. Yet another embodiment of the present disclosure may further include a non-transitory computer readable medium comprising machine executable instructions that may be executable by a processor to receive a request from a user to modify a computing environment. The request includes at least one of, a root installation request for a package associated with an existing activity in the computing environment or a plurality of root installation requests associated with a new activity in the computing environment. Further, the processor retrieves a set of available versions of one or more packages associated with at least one of the existing activity or the new activity, from one or more package source database, based on receiving the request. Furthermore, the processor analyzes iteratively one or more homogenous dependencies and one or more heterogenous dependencies for the retrieved set of available versions of the one or more packages, using semantic versioning. Thereafter, the processor determines one or more acceptable versions of the one or more packages, upon analyzing the one or more homogenous dependencies and one or more heterogenous dependencies for the retrieved set of available versions. The one or more acceptable versions are determined based on analyzing one or more dependency notations associated with the one or more packages and determining one or more final versions to be installed from one or more acceptable versions of the one or more packages, from the analyzed one or more dependency notations. Further, the processor generates one or more dependency graphs for the one or more acceptable versions of the one or more packages. Generating the one or more dependency graphs includes forming one or more product dependency graphs and one or more package dependency graphs to use one or more packages associated with at least one of the existing activity or the new activity. Furthermore, the processor performs unification of the one or more acceptable versions of the one or more packages based on the one or more dependency graphs. A final unified version of the one or more packages is selected based on analyzing one or more primary ordinal directions and one or more subordinal directions of dependencies associated with the one or more acceptable versions of the one or more packages. Thereafter, the processor determines one or more policies and claim requirements for the one or more policies associated with the final unified version of the one or more packages, upon performing unification of the one or more acceptable versions of the one or more packages. The unification of the one or more acceptable versions of the one or more packages is not affected by deficiencies in the one or more policies. Also, the processor activates one or more packages in the final unified version, when a claim grant for the one or more policies is obtained. Further, the processor determines rights deficiency for the final unified version to validate licensing requirements associated with the unified version based on a prestored licensing rules. Furthermore, the processor generates a set of recommendations to acquire required licenses or satisfy policy claim requirements for the one or more packages, when the validated licensing requirements associated with the final unified version is not satisfied. Thereafter, the processor installs the final unified version of the one or more packages into an installation target location which is independent of other installation target locations, based on acquiring the required licenses. Each of the installation target locations are independent with respect to one or more packages installed into the each of the installation target locations.

Figure 1:
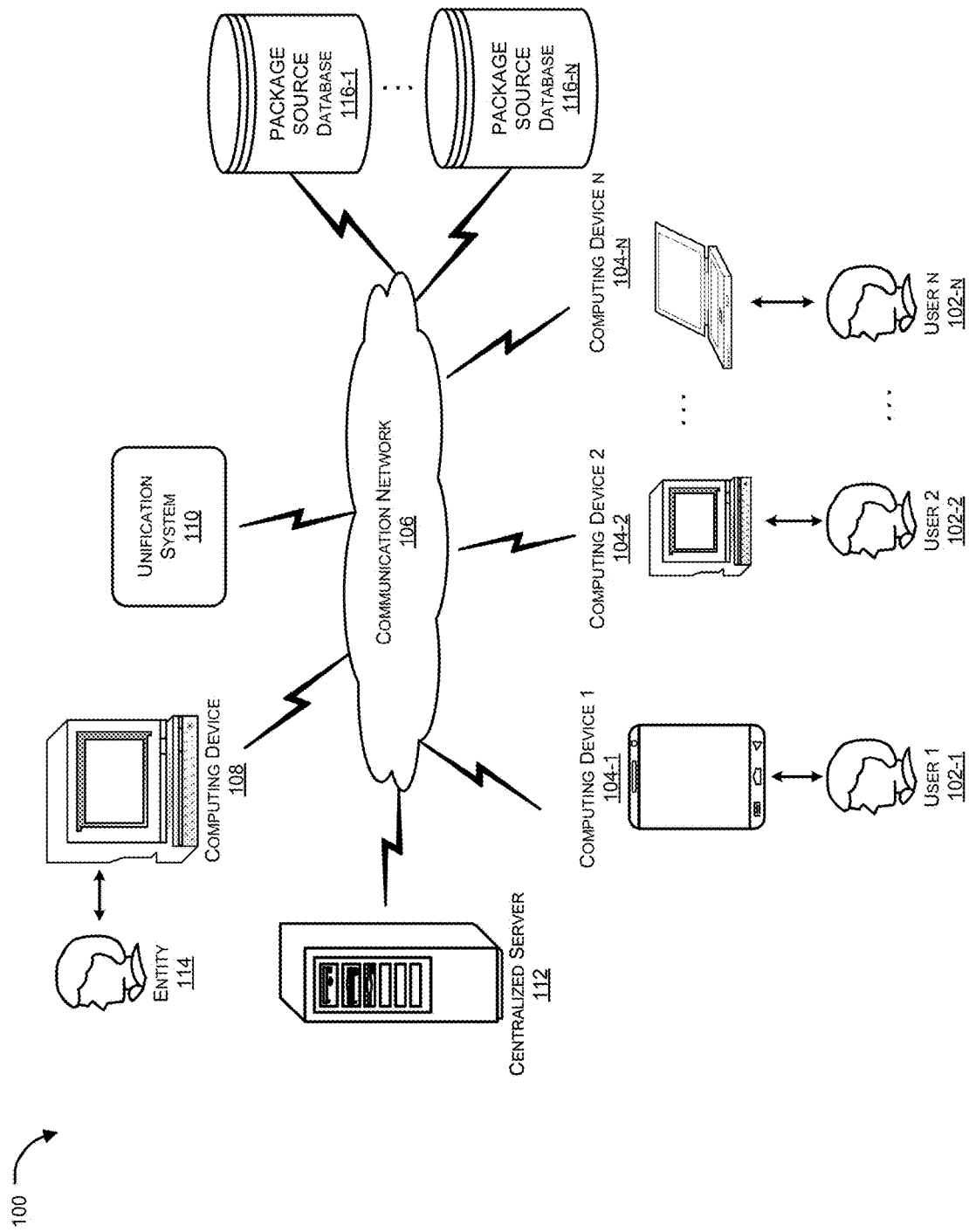
FIG. 1 illustrates an exemplary network architecture in which or with which the system of the present disclosure can be implemented for managing unification of plurality of concurrent activities in a computing environment, in accordance with embodiments of the present disclosure.

The foregoing shall be more apparent from the following more detailed description of the invention.

DETAILED DESCRIPTION OF THE PREFERRED EMBODIMENTS

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention provides a robust, improved and flexible method and system for managing unification of plurality of concurrent activities in a computing environment. Embodiments herein improves package management and delivers more reliable and correct package unification and dependency closure, by extending semantic versioning with a semantic version dependency notation. Embodiments herein improves the software package licensing using a claims-based licensing technique that delivers more licensing flexibility with less effort. Embodiments herein is designed with marketplace intent, to function as a central management point for licenses both for software vendors/content providers and for the users. Embodiments herein combines unification of one or more packages and the claims-based licensing technique to create an infrastructure platform that supports the emergence of a composable business architecture and a digital economy. Embodiments herein provides an ecosystem content which is completely open so that anyone can develop and contribute content and find a marketplace where products can compete and be discovered. The ecosystem content integration into the solution may be effortless and automatic and the ecosystem content can build off of other ecosystem content, creating hierarchical complexities in terms of installation. Embodiments herein increase the flexibility and expressiveness for software vendors to create policies and lowers the level of effort that ecosystems and software vendors are burdened with to assist users in resolving licensing issues. Embodiments herein support composable software systems, that is software systems that can require licensing from multiple third-party vendors to be satisfied simultaneously for the system to work. Embodiments herein creates cross-cutting value-added benefits, such as Export Administration Regulations (EARs) and International Traffic in Arms Regulations (ITARs) compliance infrastructure, or Department of Defense Authority To Operate (ATO) compliance infrastructure, in which package authors can leverage trusted policies that ensure proper handling of packages that have legal distribution restrictions. Further, the embodiments provide cross-cutting value-added benefits, such as security infrastructure in which package authors leverage infrastructure security testing and verification, and certification. Embodiments herein, not only manages the licensing requirement, but also supports digital product creation.

Referring to FIG. 1 that illustrates an exemplary network architecture for a unified package installation system 100 (also referred to as architecture 100) in which or with which a unification system 110 or simply referred to as the system 110 of the present disclosure can be implemented, in accordance with embodiments of the present disclosure. As illustrated, the exemplary architecture 100 may be equipped with the system 110 for facilitating implementation of unified package installation to users 102-1, 102-2, 102-3 . . . 102-N (individually referred to as the user 102 and collectively referred to as the users 102) associated with one or more first computing devices 104-1, 104-2 . . . 104-N. The system 110 may be associated with each of the one or more first computing devices 104-1, 104-2 . . . 104-N (individually referred to as the first computing device 104 and collectively referred to as the first computing devices 104). The system 110 may be further operatively coupled to a second computing device 108 associated with an entity 114, via the communication network 106. The entity 114 may include, but is not limited to, a content contributor, a company, a software vendor, an organization, a licensor, a distributor, a software claim approver, a datacenter, a business enterprise, or any other secured facility, and the like. The communication network 106 may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The communication network 106 may include by way of example, but not limited to, one or more of, a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, some combination thereof, and the like.

Further, the one or more first computing devices 104, and the one or more second computing devices 108 may include, but not limited to, any electrical, electronic, electro-mechanical or an equipment or a combination of one or more of the above devices such as mobile phones, smartphones, tablets, phablets, Virtual Reality (VR) devices, Augmented Reality (AR) devices, laptops, general-purpose computers, desktops, Personal Digital Assistants (PDAs), tablet computer, mainframe computer, microcomputer, or any other computing device, and the like. The computing devices may include one or more in-built or externally coupled accessories including, but not limited to, a visual aid device such as camera, audio aid, a microphone, a keyboard, input devices for receiving input from the user 102 such as touch pad, touch enabled screen, electronic pen, receiving devices for receiving any audio or visual signal in any range of frequencies and transmitting devices that can transmit any audio or visual signal in any range of frequencies. Further, the computing devices may include one or more data acquisition hardware and control equipment such as, but are not limited to, pumps, compressors, manufacturing equipment, and the like. Further, the one or more first computing devices 104, and the one or more second computing devices 108 may communicate with the system 110 using set of executable instructions residing on any operating system. It should be appreciated that the one or more first computing devices 104, and the one or more second computing devices 108 may not be restricted to the mentioned devices, however, various other devices may be used which are not disclosed herein. The computing device may also be any smart computing device and the smart computing device may be one of the appropriate devices/systems for storing data and other private/sensitive information.

In some implementations, the system 110 may be preferably associated with the first computing device 104. Further, the system 110 may also be associated with a centralized server 112. The centralized server 112 may include or comprise, by way of example, but not limited to, one or more of, a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof, and the like. The centralized server 112 may also be operatively coupled to the one or more first computing devices 104 and the second computing devices 108 through the communication network 106. The system 110 may be implemented in an electronic device, a mobile device, a server, and the like. Such server may include, but not limited to, a standalone server, a remote server, a cloud server, dedicated server, a rack server, and the like.

The system may be communicatively coupled to one or more package source databases 116-1, 116-2, . . . 116-N (individually referred to as the package source database 116 and collectively referred to as the package source databases 116). The package source databases 116 may be a software repository, which may include a storage location for one or more software packages. The software packages may include applications and libraries. The "packages" which may be software articles or simply content such as images, video, or other digital payload which needs to be installed into some "installation target", which may require proper deployment and installation of packages. Further, a table of contents may also be stored, along with metadata of one or more packages. If the software repository is updated, the package manager (not shown in FIG. 1) may allow the entity 114 such as, for example, a content contributor associated with the second computing device 108, to update the software repository through the package manager. The system 110 and the centralized server 112 may own or control some of the package source databases 116, which may store different versions of a particular software package/product. The package source databases 116 may further include release notes corresponding to each of the different versions. The package source databases 116 may store, process, disseminate data, applications and associated libraries. Further, some of the package source databases 116 may not be allowed to control by the system 110 and centralized server 112. However, the system 110 may manage unification of concurrent activities, even though the system 110 may not be allowed to control some of the package source databases 116.

In some embodiments, the system 110 may include a processor (not shown in FIG. 1) and a memory (not shown in FIG. 1). The memory stores processor executable instructions, which on execution causes the processor to perform below mentioned steps. In some embodiments, the system 100 receives a request from the user 102 to modify a computing environment. The computing environment may be associated with the first computing device 104. In various embodiments, the request(s) includes, but is not limited to, a root installation request for a package associated with an existing activity in the computing environment or a plurality of root installation requests associated with a new activity in the computing environment, and the like. Further, the system 110 may retrieve a set of available versions of one or more packages associated with at least one of the existing activity or the new activity, from one or more package source database 116, based on receiving the request. Furthermore, the system 110 may analyze iteratively one or more homogenous dependencies and one or more heterogenous dependencies for the retrieved set of available versions of the one or more packages, using semantic versioning. In various embodiments, the semantic versioning includes but is not limited to, a major version, a minor version, pre-release version, a build version, a patch version, and the like.

For example, a software package may have new versions issued to address a variety of new features or bug fixes, and versions may have improved reliability for some features, but introduce newer and less reliable features. Similarly, a software package's dependencies have versions with similar complex relationships with feature sets and feature quality. For complex composable systems, it is desirable for a system to manage these complex relationships without requiring the user 102 to understand them.

In various embodiments, the system 110 may determine one or more acceptable versions of the one or more packages, upon analyzing the one or more homogenous dependencies and one or more heterogenous dependencies for the retrieved set of available versions. In some embodiments, the one or more homogenous dependencies comprises one package dependency with another package in the same installation target location. In some embodiments, the one or more heterogenous dependencies comprises packages in different installation target locations from the installation target location of an original package. The one or more acceptable versions may be determined based on analyzing one or more dependency notations associated with the one or more packages and determining one or more final versions to be installed from one or more acceptable versions of the one or more packages, from the analyzed one or more dependency notations. In some embodiments, determining one or more acceptable versions of the one or more packages for the set of available versions, further includes selecting, by the system 110, based on a pre-defined preference associated with the one or more acceptable versions of the one or more packages. In some embodiments, the pre-defined preference includes preferencing, but is not limited to, lower major versions over higher major versions, lower minor versions over higher minor versions, lower patch versions over higher patch versions, lower pre-release versions over higher pre-release versions, and the like. In some embodiments, the system 110 may evaluate a dependency notation of the pre-release version independently of at least one of, a dependency notation of a normal version which includes a set of at least one of a dependency notation of the major version, a dependency notation of the minor version, and a dependency notation of the patch version. The dependency notation of the major version, the dependency notation of the minor version, and the dependency notation of the patch version form the one or more primary ordinal directions. The one or more dependency notations may further include interval dependency notation. In some embodiments, the system 110 overrides the pre-defined preference using a wild card for one or more acceptable versions of the one or more packages and select higher versions over lowest versions.

Further, the system 110 may generate one or more dependency graphs for the one or more acceptable versions of the one or more packages. In some embodiments, generating the one or more dependency graphs includes forming one or more product dependency graphs and one or more package dependency graphs to use one or more packages associated with at least one of the existing activity or the new activity. Furthermore, the system 110 may perform unification of the one or more acceptable versions of the one or more packages based on the one or more dependency graphs. In some embodiments, a final unified version of the one or more packages may be selected based on analyzing one or more primary ordinal directions and one or more subordinal directions of dependencies associated with the one or more acceptable versions of the one or more packages. In some embodiments, when performing unification of the one or more acceptable versions of the one or more packages, if the unification is not successful due to multiple dependency requirements, then the unification results in unification error or the one or more acceptable versions of the one or more packages is installed side by side into a cache to install the final unified version of the one or more packages from the cache into the target location, based on acquiring the required licenses. In some embodiments, installing side by side includes multiple versions of a same package to be installed to the installation target location. In some embodiments, installing the final unified version includes one version of a package to be installed to the installation target location. In some embodiments, performing unification of the one or more acceptable versions of the one or more packages based on the one or more dependency graphs, further includes inputting, by the system 110, each stage of unification result in the one or more dependency graphs to a dependency operator. Further, the system 110 may apply an operation of the dependency operator to provide each stage of unification result as an output to subsequent dependency operator in the one or more dependency graphs. For example, at the time a unification occurs, the unification result may be based on currently available package versions, and that if the unification is reassessed later or an identical root installation request is issued in the same system state, the unification result could be different if new versions are available.

In some embodiments, the system 110 may determine one or more policies and claim requirements for the one or more policies associated with the final unified version of the one or more packages, upon performing unification of the one or more acceptable versions of the one or more packages. The unification of the one or more acceptable versions of the one or more packages may not be affected by deficiencies in the one or more policies. Further, the system 110 may activate one or more packages in the final unified version, when a claim grant for the one or more policies is obtained. In some embodiments, the claim grant may be transmitted to the computing environment whenever claim grants from the associated claim store are requested. In some cases, the claim grant is only be transmitted to the computing environment when specifically requested for the claim store.

In some embodiments, the system 110 may determine rights deficiency for the final unified version to validate licensing requirements associated with the unified version based on a prestored licensing rules. Further, the system 110 may generate a set of recommendations to acquire required licenses for the one or more packages, when the validated licensing requirements associated with the final unified version is not satisfied. Furthermore, the system 110 may install the final unified version of the one or more packages into an installation target location which is independent of other installation target locations, based on acquiring the required licenses. The installation target location may be in the first computing device 104. Each of the installation target locations are independent with respect to one or more packages installed into the each of the installation target locations.

Figure 2:
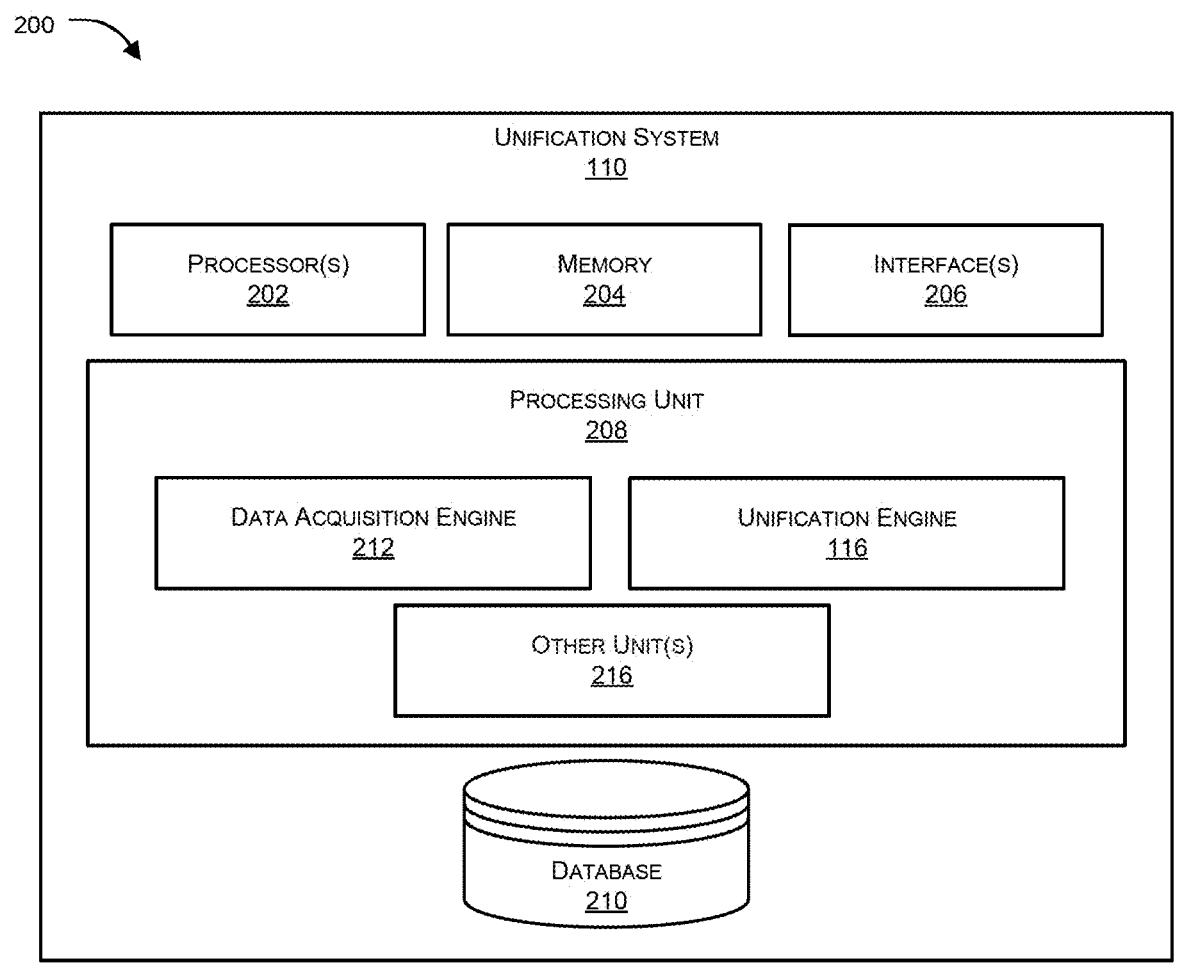
FIG. 2 illustrates an exemplary representation of resource allocation system for implementing a unification of plurality of concurrent activities, in accordance with embodiments of the present disclosure.

FIG. 2 (with continued reference to FIG. 1) illustrates an exemplary representation of the unification system 110 (also referred hereinafter as system 110) for implementing a unification of plurality of concurrent activities, in accordance with some embodiments of the present disclosure. In an aspect, the unification system 110 may include one or more processor(s) 202. The one or more processor(s) 202 may be implemented as one or more microprocessors, microcomputers, microcontrollers, digital signal processors, central processing units, logic circuitries, and/or any devices that process data based on operational instructions. Among other capabilities, the one or more processor(s) 202 may be configured to fetch and execute computer-readable instructions stored in a memory 204 of the unification system 110. The memory 204 may be configured to store one or more computer-readable instructions or routines in a non-transitory computer readable storage medium, which may be fetched and executed to create or share data packets over a network service. The memory 204 may comprise any non-transitory storage device including, for example, volatile memory such as RAM, or non-volatile memory such as EPROM, flash memory, and the like.

In some embodiments, the unification system 110 may include an interface(s) 206. The interface(s) 206 may comprise a variety of interfaces, for example, interfaces for data input and output devices, referred to as I/O devices, storage devices, and the like. The interface(s) 206 may facilitate communication of the unification system 110. The interface(s) 206 may also provide a communication pathway for one or more components of the unification system 110. Examples of such components include, but are not limited to, processing engine(s) 208 and a database 210.

The processing engine(s) 208 may be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may comprise a processing resource (for example, one or more processors), to execute such instructions. In the present examples, the machine-readable storage medium may store instructions that, when executed by the processing resource, implement the processing engine(s) 208. In such examples, the unification system 110 may comprise the machine-readable storage medium storing the instructions and the processing resource to execute the instructions, or the machine-readable storage medium may be separate but accessible to the unification system 110 and the processing resource. In other examples, the processing engine(s) 208 may be implemented by electronic circuitry.

The processing engine 208 may include one or more engines selected from any of a data acquisition engine 212, a unification engine 214, and other engines 216. In some embodiments, the data acquisition engine 212 of the unification system 110 receives a request from the user 102 to modify a computing environment and retrieve a set of available versions of one or more packages associated with at least one of the existing activity or the new activity, from one or more package source database 116, based on receiving the request. Further, the unification engine 214 may analyze iteratively one or more homogenous dependencies and one or more heterogenous dependencies for the retrieved set of available versions of the one or more packages, using semantic versioning. Further, the unification engine 214 may determine one or more acceptable versions of the one or more packages, upon analyzing the one or more homogenous dependencies and one or more heterogenous dependencies for the retrieved set of available versions. Thereafter, the unification engine 214 may generate one or more dependency graphs for the one or more acceptable versions of the one or more packages. Furthermore, the unification engine 214 may perform unification of the one or more acceptable versions of the one or more packages based on the one or more dependency graphs. In some embodiments, the unification engine 214 may determine one or more policies and claim requirements for the one or more policies associated with the final unified version of the one or more packages, upon performing unification of the one or more acceptable versions of the one or more packages. Further, the unification engine 214 may activate one or more packages in the final unified version, when a claim grant for the one or more policies is obtained. In some embodiments, the unification engine 214 may determine rights deficiency for the final unified version to validate licensing requirements associated with the unified version based on a prestored licensing rules. Further, the unification engine 214 may generate a set of recommendations to acquire required licenses for the one or more packages, when the validated licensing requirements associated with the final unified version is not satisfied. Furthermore, the unification engine 214 may install the final unified version of the one or more packages into an installation target location which is independent of other installation target locations, based on acquiring the required licenses.

For example, the data acquisition engine 212 of the unification system 110 may receive a request from the user 102 to modify a computing environment. In some embodiments, the request includes, but is not limited to, a root installation request for a package associated with an existing activity in the computing environment or a plurality of root installation requests associated with a new activity in the computing environment, and the like. In one example, the request may be a root installation request. In another example, a target software package such as the one or more packages may be a specific software package being installed to a specific installation target location such as the one or more first computing devices 104. In some cases, only a single version of the software package may be installed to an installation target location, and the version of the software package may be selected by "unifying" multiple requests for different versions of the software package. If a new root installation request results no single package version being able to satisfy all the root installation requests, then the root installation requests may be over-constrained, and the new root installation request may fail to unify multiple requests for different versions of the software package.

Not all installation target locations may be same. Some installation target locations may allow multiple versions of the software package to be installed "side-by-side". As an example, MPLAB® X may be installed to the installed applications installation target location (where all normal Windows® installations are installed), and multiple versions of MPLAB® X can be installed simultaneously. Other applications, however, may require that only one version may be installed at a time. In this scenario, in the same installation target location, some packages may be side-by-side, and some may be unified, depending on the package. In this scenario, the installation target location may not be designed to force all packages to be installed side-by-side, however the software package may indicate to the system 110 whether the software package allows to be unified or allows to be installed side-by-side. In other installation target locations, the installation target location such as the one or more first computing devices 104 may direct the system 110 to disable unification regardless of a metadata of the software package and may install all packages side-by-side in the installation target location. For example, if software packages may be installed to a cache of the one or more first computing devices 104 (or the system 110), the intent is likely that all versions may be cached as the versions are handled. For the same software package, all versions may be installed side-by-side into a cache or caches of the one or more first computing devices 104 (or the system 110) and then later a single unified version may be installed into the one or more first computing devices 104. Further, one or more dependency notations may be in the context of unified target software package unification, and may also applies to requests to install side-by-side target software packages.

In some embodiments, the unification system 110 via the acquisition engine 212 may retrieve a set of available versions of one or more packages associated with at least one of the existing activity or the new activity, from one or more package source database 116, based on receiving the request. Furthermore, the system 110 may analyze iteratively one or more homogenous dependencies and one or more heterogenous dependencies for the retrieved set of available versions of the one or more packages, using semantic versioning. In some embodiments, the semantic versioning includes but is not limited to, a major version, a minor version, pre-release version, a build version, a patch version, and the like.

For instance, when a software package "A" depends on another software package "B", the dependency may be specified using one or more dependency notations. The one or more dependency notations may use a format convention to manage versions of the software package that may be acceptable out of all first pre-defined versions of the software package. After the first pre-defined versions are filtered, the one or more dependency notations may also determine which final version from the acceptable versions may be selected for installation in the target location. For example, if the software package "A" depends on exactly version "2.0.0" of the software package "B", the one or more dependency notation may be as "[2.0.0]". For example, the square brackets before and after "2.0.0" may indicate an inclusive lower and upper bound, respectively. Since, both the lower and upper bounds are inclusive, and the only version between them is 2.0.0, then the only version that may satisfy the dependency may be version 2.0.0. Further, different lower and upper bounds separated by a comma may also be used, such as "[2.0.0,2.1.0]". This dependency notation may indicate that any version greater than or equal to "2.0.0" and less than or equal to "2.1.0" may be acceptable. A basic interval dependency notation used to specify dependencies is shown in Table 1 below.

TABLE 1

| # | Notation | Applied filtering rule | Description |
|---|----------|------------------------|-------------|
| 1 | 1.0 | x >= 1.0 | Minimum version, inclusive |
| 2 | [1.0] | x == 1.0 | Exact version match |
| 3 | (, 1.0] | x ≤ 1.0 | Maximum version, inclusive |
| 4 | (, 1.0) | x < 1.0 | Maximum version, exclusive |
| 4 | [1.0, 2.0] | 1.0 ≤ x ≤ 2.0 | Exact range, inclusive |
| 5 | (1.0, 2.0) | 1.0 < x < 2.0 | Exact range, exclusive |
| 6 | [1.0, 2.0) | 1.0 ≤ x < 2.0 | Inclusive min, exclusive max |

The system 110 may use semantic versioning technique for the versioning of the software package, which may consist of, for example, major version, minor version, patch version, optional pre-release version and build packages/version. The semantic versioning technique may be a set of rules and requirements that may dictate how version numbers are assigned and incremented. These rules may be based on, but not limited to, a pre-existing widespread common practice in use in both closed and open-source software, and the like. In an instance, for semantic versioning technique a public Application Programming Interface (API), may need to be declared. This may consist of documentation or be enforced by the code itself. Regardless, it is important that the API be clear and precise. Once public API is identified, changes to the public API with specific increments to version number is performed. Consider a version format of X.Y.Z (Major. Minor. Patch). Bug fixes may not affect the API increment the patch version, backwards compatible API additions/changes increment the minor version, and backwards incompatible API changes increment the major version. In the semantic versioning technique, the version numbers and the way the version numbers change convey meaning about the underlying code and what has been modified from one version to the next.

The examples in the above Table 1 are valid dependency notations but did not reference the patch versions. Semantic versions may require the patch version to be specified, thus for any dependency notations with an omitted patch version, a patch version of "0" may be implied. Considering the pre-release and the build versions, the examples in the above Table 1 did not include pre-release or build version packages. The version dependency notations may not reference the build version packages. The build version packages may be available in the semantic versioning technique to provide additional information associated with the build version packages. However, the additional information associated with the build version packages should not be used to distinguish one version from other versions of the same major/minor/patch/pre-release versions. T hus, for dependency notation purposes, the additional information associated with the build version packages may be completely ignored. With the dependency notation, the dependency interval notation of the pre-release version may be evaluated completely independently of the normal major/minor/patch dependency interval notation. If pre-release versions are not explicitly referenced in an interval notation, then the pre-release versions may be filtered out and may not be used.

When the pre-release versions are selected, the dependency notation rules may be as follows:

the pre-release version may be treated as independently from the main version.

if a pre-release package is not referenced in a dependency notation, then the pre-release versions may not be accepted by the dependency.

the same major/minor/patch interval notation rules as above apply for pre-release interval notation.

Figure 3A:
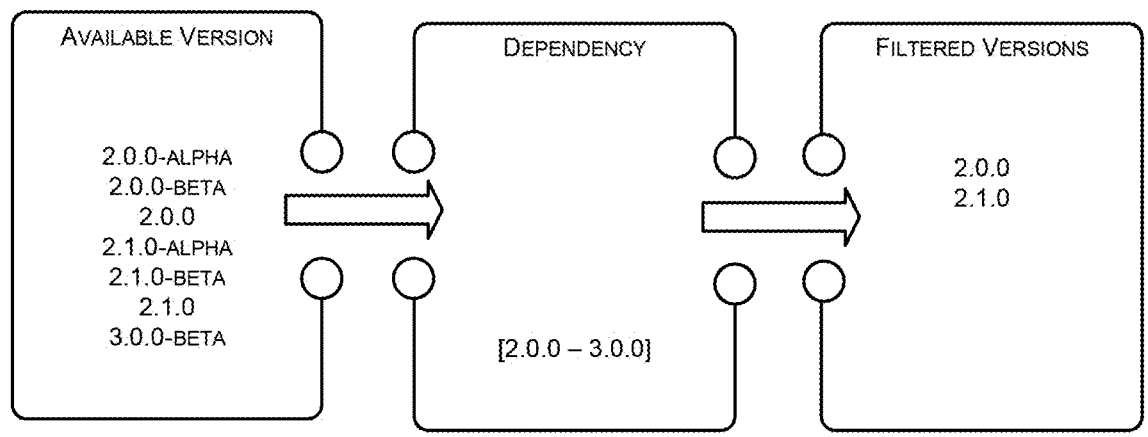
FIGS. 3A and 3B illustrate exemplary schematic representations of dependency notation rules for filtering versions of one or more packages, in accordance with embodiments of the present disclosure.
Figure 3B:
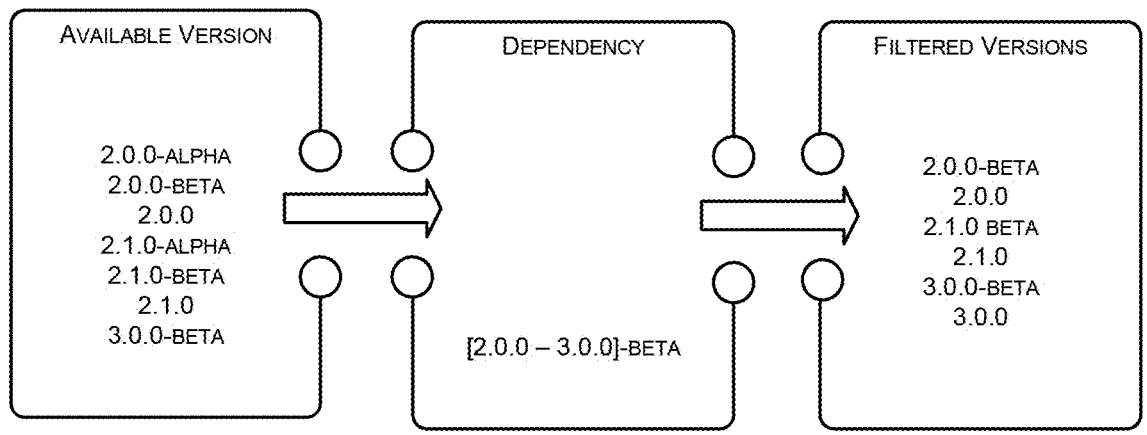

In some embodiments, the system 110 via the unification engine 214 may determine one or more acceptable versions of the one or more packages, upon analyzing the one or more homogenous dependencies and one or more heterogenous dependencies for the retrieved set of available versions. In some embodiments, the one or more homogenous dependencies comprises one package dependency with another package in the same installation target location. In some embodiments, the one or more heterogenous dependencies comprises packages in different installation target locations from the installation target location of an original package. The one or more acceptable versions may be determined based on analyzing one or more dependency notations associated with the one or more packages and determining one or more final versions to be installed from one or more acceptable versions of the one or more packages, from the analyzed one or more dependency notations. Determining one or more acceptable versions of the one or more packages for the set of available versions, may further include selecting, by the system 110, based on a pre-defined preference associated with the one or more acceptable versions of the one or more packages. In some embodiments, the pre-defined preference includes preferencing, but not limited to, lower major versions over higher major versions, lower minor versions over higher minor versions, lower patch versions over higher patch versions, lower pre-release versions over higher pre-release versions, and the like. For example, consider the dependency specified with the set of available versions of packages as shown in FIG. 3A. In the example shown in FIG. 3A, the versions "2.0.0" and "2.1.0" may meet the criteria, because the upper range limit of "3.0.0" may be exclusive, and pre-release versions may not be accepted by the dependency (pre-release versions are assumed to be potentially buggy). Now considering the dependency specified with the set of available versions of packages as shown in FIG. 3B. In the example shown in FIG. 3B, the version "3.0.0-beta" and "3.0.0" may be accepted with respective main version because the upper limit of "3.0.0" may be inclusive. The beta versions may be accepted because the pre-release dependency notation of "-beta" means that pre-release versions may be acceptable if the pre-release evaluates to greater than or equal to the beta pre-release.

In another instance, the dependency "2.0.0-(alpha,]" may specify non-interval notation for the main version and interval notation for the pre-release version. With the dependency notation, any main version ">=2.0.0" may be acceptable, and it may be acceptable if it were a pre-release version, as long as the pre-release version was greater than the alpha. The above examples may only consider a single dependency requirement, however a package in general may have multiple dependency requirements registered, and all dependency requirements must be satisfied. If, no single version meets all requirements, then it may result in a unification error (for unified packages) or it may result in two versions of the package being installed (for side-by-side packages).

Upon filtering the versions, the final version may be selected when multiple versions meet the filters. The system 110, by default, may select versions based on the following default pre-defined preferences:

lower major versions may be preferred over higher major versions. As per the semantic versioning convention, higher major versions may be expected to have breaking changes, and may only be accepted as a last option. A common practice may be to use the next major version as a non-inclusive upper bound, so that all versions up to the next new major version may be accepted. For example, a dependency of "(,3)" may accept any version up to but excluding version "3.0.0". Thus, newer versions of "2.x" may be accepted as they are made available.

lower minor versions may also be preferred over higher minor versions. Although minor versions may be expected to introduce new functionality without producing breaking changes, there may be more chance that a new minor version may have bugs.

lower patch versions may be preferred over higher patch versions. Although it may be assumed that higher patch versions have less issues than lower patch versions, if the lowest version has been tested and working, the lowest version may be preferred by default. The default preferences may be changed using wildcards as described below.

lower pre-release versions may be preferred over higher pre-release versions.

Since, higher pre-release versions (i.e., beta) may be expected to be more stable than the lower pre-release versions (i.e., alpha), it is generally recommended to override this default behavior using a wildcard as described below.

For instance, wildcard dependency notation may be used in the major version, or minor version, or patch version, or at the end of the pre-release version, to indicate that any version that matches all other constraints may be acceptable. Further, wildcards may indicate that the highest version may need to be selected, as opposed to the default lowest version. For example, for the dependency "4.1.*", any main version with a major version of "4" and minor version of "1" may be acceptable, and the version with the maximum patch version may be selected. Further, a dependency of "4.*" may result in the highest version of major version "4" being selected. Note that the patch may not be referenced when the minor version is wildcard, thus "4.*.*" may be an invalid dependency notation. The specification of a wildcard in the major version may not generally be recommended, as major versions introduce breaking changes. However, since versions of installed applications commonly increment the major version, the wildcard dependency notation for the major version may be accepted by the system 110.

Further, package versions, version dependencies and in particular version unification results may be difficult to conceptualize, particularly when dealing with an entire unification domain. The semantic versioning technique may be used for conceptualizing the package versions, version dependencies and version unification. Further, the system 110 may use the package dependency formation which further includes a cardinal values, ordinal values, subordinal values, and nominal values. The "nominal values" may be a number that may be used to uniquely identify versions of software packages, for example, number on a sports player jersey. Further, the "cardinal values" may be a number that represents a count of something, without any regard to the relationships between the items being counted. Furthermore, the "ordinal" may be a number given to indicate an order of an item in a list (i.e., an indication of an item's relationship with respect to other items).

The semantic versioning technique may assign semantic meaning to elements of a versioned article such as the software packages, making it easier to identify the best version of the article to be used in a context. These versions may behave like all three types of numbers such as the cardinals, ordinals, and nominals. The cardinals, ordinals, and nominals may provide a nominal to uniquely identify a release, may be used to count the number of major, minor, and patch versions, and may provide ordinal information about earlier and later releases. The use of minor and patch versions may add ambiguity regarding which versions are "earlier" and "later" releases, since version "2.3.4" of the software package may be released after version "3.1.0" of the same package. However, if the intent is to fix a bug to an earlier version "3.1.0", then the version "2.3.4" of the software package may be still otherwise valid to be installed to fix the bug of the "3.1.0" version. With the simple addition of dependency notations of minor and patch versions, the ordinality may already be lacked. Given a set of acceptable versions that span across multiple minor and patch versions, for unified target software packages the set may be reduced to a single version.

Figure 3C:
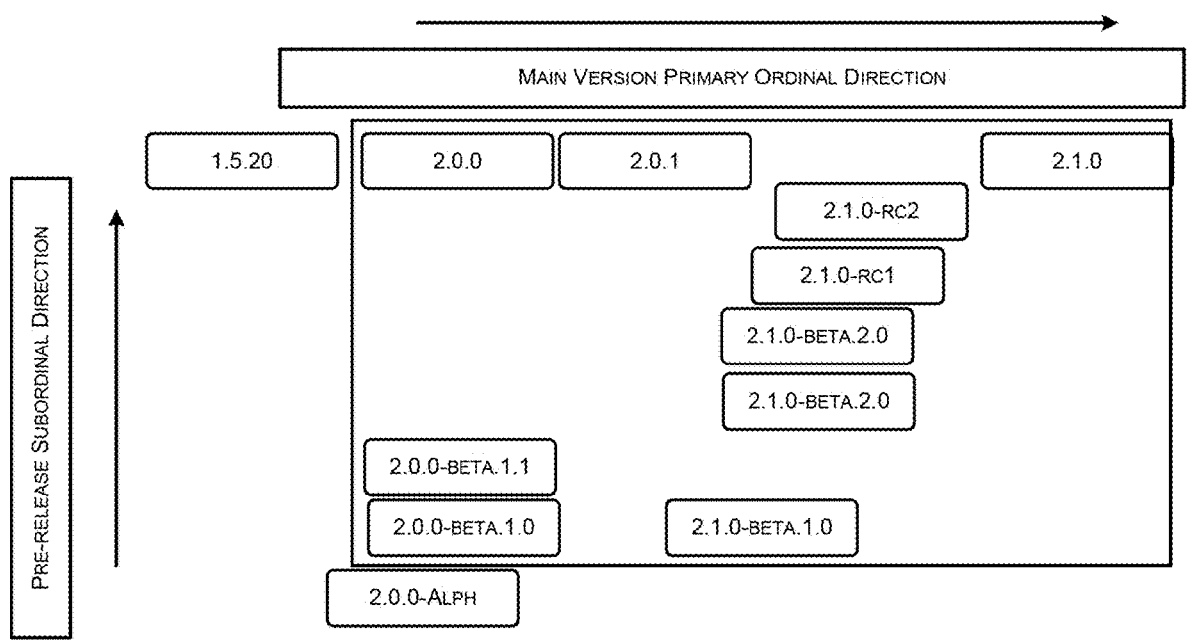
FIG. 3C illustrates an exemplary graphical representation of a pre-release interval notation in vertical bounds with subordinal prerelease direction and a main version interval notation in horizontal bounds with primary ordinal direction, in accordance with embodiments of the present disclosure.

The main versions (major/minor/build) in a set can be considered as ordinal along a single primary axis. The pre-release versions may be a bit of an anomaly, as it is not given that "3.2.0-beta" is "greater" or "better" than "3.1.32". Further, the set of pre-release versions of a specific main version may be considered as an independent subordinal set of versions, which may not be clearly related to the ordinal set of release versions. In the dependency notation, when pre-release versions are not specified, they are excluded by default. When they are specified, they define an interval that may be evaluated independently from the main version interval. On the other hand, the pre-release interval dependency notation, if indicated, may be considered as the vertical bounds along the subordinal pre-release direction. The main version interval dependency notation may define the horizontal bounds along the primary ordinal direction. Both the pre-release interval dependency notation and the main version interval dependency notation combined together may form a box of acceptable versions, when the versions are organized as shown in FIG. 3C.

Further, the system 110 may generate one or more dependency graphs for the one or more acceptable versions of the one or more packages. In some embodiments, generating the one or more dependency graphs includes forming one or more product dependency graphs and one or more package dependency graphs to use one or more packages associated with at least one of the existing activity or the new activity. Furthermore, the system 110 may perform unification of the one or more acceptable versions of the one or more packages based on the one or more dependency graphs. In some embodiment, a final unified version of the one or more packages is selected based on analyzing one or more primary ordinal directions and one or more subordinal directions of dependencies associated with the one or more acceptable versions of the one or more packages. In some embodiments, when performing unification of the one or more acceptable versions of the one or more packages, if the unification is not successful due to multiple dependency requirements, then the unification results in unification error or the one or more acceptable versions of the one or more packages is installed side by side into a cache to install the final unified version of the one or more packages from the cache into the target location, based on acquiring the required licenses. In some embodiments, installing side by side includes multiple versions of a same package to be installed to the installation target location. In some embodiments, installing the final unified version includes one version of a package to be installed to the installation target location. In some embodiments, performing unification of the one or more acceptable versions of the one or more packages based on the one or more dependency graphs, further includes inputting, by the system 110, each stage of unification result in the one or more dependency graphs to a dependency operator. Further, the system 110 may apply an operation of the dependency operator to provide each stage of unification result as an output to subsequent dependency operator in the one or more dependency graphs.

For instance, the unification process may combine multiple dependencies that reference a specific "target package" (a specific package to be installed to a specific target location) to produce a unification result. The dependencies referencing the target software package may be accumulated as the dependency graph gets more complex. As mentioned above, the target software package may be of a "unified" type, in which the unification result must be one version, or "side-by-side" type, in which the multiple versions of the software package may be installed to the same target location such as the one or more first computing devices 104. For side-by-side target packages, a unification process may still occur, and the unification result aims to minimize the number of different versions that are installed while satisfying all requirements. However, the general unification theory and process may be essentially the same. The individual dependency notation applied to the target software package may be considered as an operation that is applied prior unification result, which may be producing a new unification result. The dependency operations may be a mathematically commutative with respect to the immediate target software packages, where unification may be occurring, in that the order that the dependencies may be applied to a specific target software package may not affect the unification result. However, the version resolution of that target software package may also resolve the dependencies for the target software package, as different versions of the software package may have different dependencies. This results in further unification of other target software packages whenever one target package may be unified, in a recursive manner. Thus, the process of unification for one target software package may be just one step in the unification of the entire unification domain, which consists of all packages for all installation target location.

Figure 4A:
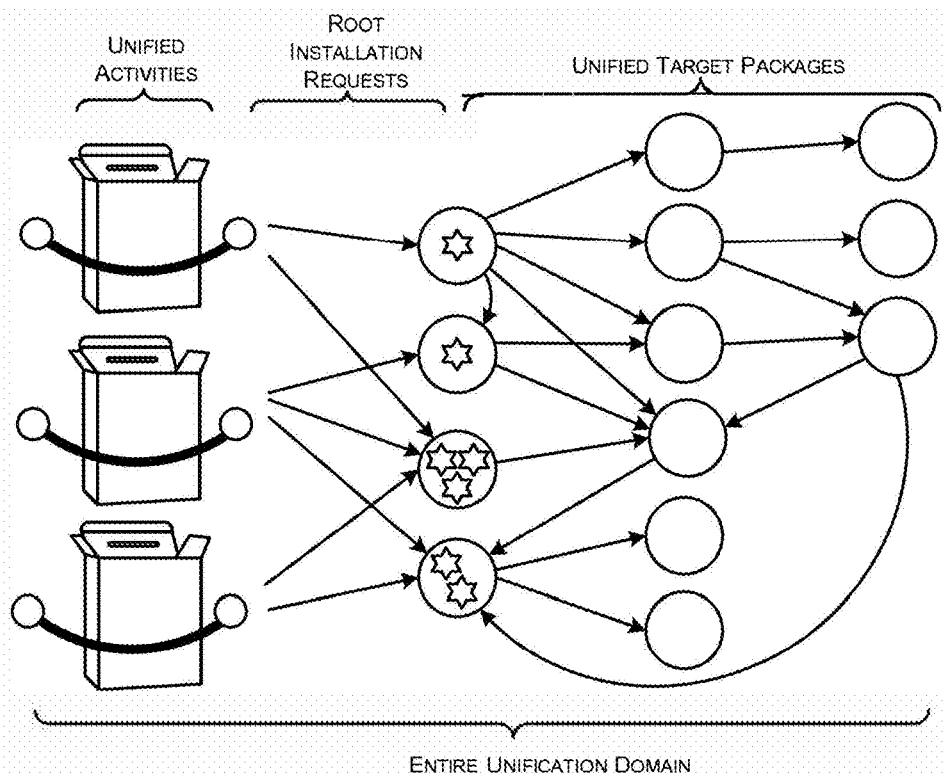
FIGS. 4A and 4B illustrate exemplary dependency graph representations of one or more activities and one or more packages, in accordance with an embodiment of the present disclosure.
Figure 4B:
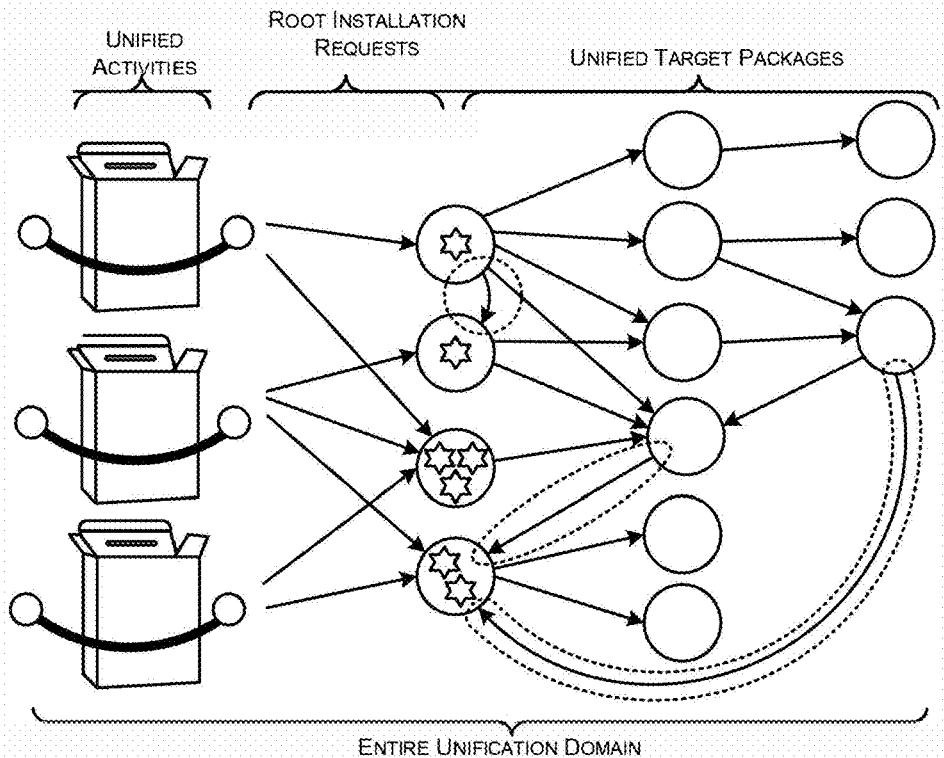

Further, unification domain may be the entire dependency graph of all activities and target software packages, as shown in the FIG. 4A. Each circle in the dependency graph may represent a target software package that may need to be unified. The dependency graph (domain) may be formed by adding "root installation requests" to the domain, shown as stars in the FIG. 4A. Each attempt to add a root installation request may result in a fully unified domain, or the root installation request may reject, as the domain must always remain unified. The domain may only be altered by adding or removing root installation requests. The arrows between circles in the FIG. 4A may represent a dependency on another target software package. The dependency may be the final dependency from the target software package after that target package version is resolved, as the different versions of the target software package may have different dependencies on other software packages. Thus, adding a new root installation request may result in target packages being disappeared, if a resolved target software package version changes to a version that no longer depends on another target software package. Further, each star in the FIG. 4A may represent a root installation request expressed as a normal package dependency for an installation target location. It may be valid for multiple root installation requests to reference the same target software package, as long as the domain is unified. Similarly, root installation requests may form resolved dependencies on other target software packages that are referenced by root installation requests, and target software packages far removed from root installation requests may also form dependencies on target packages directly referenced by root installation requests and influence resolved versions. These scenarios may be shown in FIG. 4B. The target software packages shown in FIG. 4B may be arranged in columns and colored red, blue, and green to convey proximity to the root installation requests and dependency formation. However, the dependency graph may not be a directed acyclic graph and may be quite complex. The mechanics of the dependency graph formation may be the most important concepts. Each circle in the shown in FIG. 4B may represent a target software package with the version that nay be resolved based on all dependencies, which may be represented either as a star (root installation request) or an arrow. The process of unification also involves the process of installation or uninstallation of software packages. The inability to install a software package, either due a user's 102 deficiency in a package download policy or any other reason such as insufficient hard drive space in the one or more first computing devices 104, may also be considered a unification failure, and the system 110 may always ensure that the domain is in a proper state. The system 110 may have ability to provide extensible support for any installation procedure, manage the myriad issues related to download and installation policies from both the package merchant's side and the user's organizational policy side. The system 110 may perform complex dependency graph unification, which may be uniquely well-suited for providing composable software infrastructure support.

Figure 5:
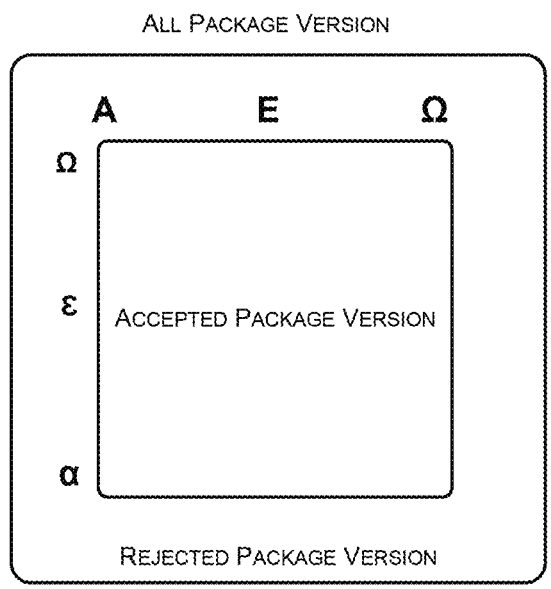
FIG. 5 illustrates an exemplary representation of unification result for one specific target package, with respect to the primary/horizontal ordinal direction and the secondary/vertical subordinal direction, in accordance with embodiments of the present disclosure.

The unification result for one specific target software package may be visualized with six parameters as shown in FIG. 5, with respect to the primary/horizontal ordinal direction and the secondary/vertical subordinal direction. As shown in FIG. 5 an "A" (i.e., upper case alpha) may be a 4-tuple parameter of three integers and a Boolean. The values represent the lower ordinal limit as a major version, minor version, patch version, and inclusion (true=inclusive, false=exclusive). Further, a "Ω" (i.e., upper case omega) may be a 4-tuple parameter of three integers and a Boolean. The values represent the upper ordinal limit as a major version, minor version, patch version, and inclusion (true=inclusive, false=exclusive). The "a" may also take a value of infinity. Furthermore, a "E" (i.e., upper case epsilon) may be a nullable Boolean that represents the selection strategy for the ordinal direction. Thereafter, a "α" (i.e., lower case alpha) may be a 2-tuple parameter of a string and a Boolean. The values may represent the lower subordinal limit as a pre-release version and inclusion (true=inclusive, false=exclusive). The "α" may take a value of infinity as indication that no pre-release versions may be acceptable. Further, a "ω" (i.e., lower case omega) may be a 2-tuple parameter of a string and a Boolean. The values may represent the upper subordinal limit as a pre-release version and inclusion (true=inclusive, false=exclusive). The "ω" may also take a value of infinity. Furthermore, a "ε" (i.e., lower case epsilon) may be a nullable Boolean that represents the selection strategy for the subordinal direction. For instance, for nullable Booleans, a value of true indicates the selection strategy is to take the highest ordinal or subordinal value, as appropriate. Further, a value of false or null may indicate the selection strategy is to take the lowest ordinal or subordinal value.

The following rules apply to both unification results and dependency operations:

the set of integers in "A" and "Ω" may both indicate a valid semantic major, minor, and patch version, except integer values in "Ω" may be infinity.

if an integer term in "Ω" is infinity, the selection strategy "E" may be true.

if the first integer term in "Ω" is infinity, the second term in "Ω" may be infinity.

if the second integer term in "Ω is infinity, the third term in "Ω" may be infinity.

the set of integers in "Ω" must express an ordinality that is greater than or equal to the corresponding set in "A".

the strings in "α" and "ω" may represent valid pre-release versions.

the pre-release version in "ω" may have a sub-ordinality that is greater than or equal to the corresponding pre-release version in "α".

A dependency operation applied on a target software package unification result may transform the unification result as follows, in the following order:

A=Ao>A?Ao:A
Ω=Ωo<Ω?Ωo:Ω
α=αo>α?αo:α
ω=ωo<ω?ωo:ω
if Eo==False:
E=False
Else if Eo==True And E!=False:
E=True
Else:
E=E//No change
If εo==False:
ε=False
Else If εo==True and ε!=False:
ε=True
Else:
ε=ε//No change.

The operator "εo" or "Eo" value of null may not valid, but an input "ε" or "E" value of null may be considered as valid. All dependencies affecting a target software package may be applied commutatively. Each dependency operator may take a unification result as an input, applies its dependency operator, and provides a unification result as an output which is then fed into the next operator. After all operations are applied, the result may be invalid if the remaining upper and lower bounds for either the ordinal or subordinal direction are the same value and exclusive (the dependency operator produces no unified area in the ordinal and subordinal space). The unification result expressed as a unified space may also encompass versions of the software package that exists to be valid. If the unified result is invalid, the operation failure alters the domain unification process accordingly. The target package unification failure may occur as part of a root installation request attachment that may finally succeed. When the target package unification results in multiple valid package versions, the final unified version may be selected based on a selection strategy that may seek in either the higher or lower ordinal and subordinal directions. Each candidate may be evaluated with all its dependencies tested to check if the dependency operation results in a successful recursive domain attachment. When all dependencies of a candidate successfully attach to the domain, the final unification result is outputted, and returned to the unification process that invoked. If the dependencies do not all successfully attach for a candidate, then the selection strategy picks the next best candidate, until there are no candidates remaining, and the resolution finally fails.

The default unification result for the target software package, before any actual dependency operations are applied, is as follows:

A=(0, 0, 0, true)
Ω=(∞, ∞, ∞, true)
E=null
α=("0", true)
ω=(Ω, true)
ε=null

The above default unification result may not exclude any package version. Below in Table 2, are some additional examples of dependency notations and their corresponding dependency operator values. The dependency operators may always have ordinal and subordinal selection strategy values of true or false, never null. The null only allows the initial condition that the selection strategy may have not been specified yet, to allow a value of True. The only cases where null values may occur on an input unification result ordinal or subordinal selection strategy may be when the first operator is being evaluated.

while specifying a range of "0" to infinity for the third, with a higher ordinal selection strategy. This dependency notation may be a functionally equivalent to example 5 ("[1.4.0, 1.5.0)*") of Table 2, however, more efficiently expresses the intended dependency. Asterisks applied after an interval, or after a complete set of all three ordinal release terms, may specifies a higher value ordinal selection strategy without imposing an upper bound on the prior terms. The same applies for the pre-release subordinal direction. Whereas the primary ordinal version may have three terms in semantic versioning technique, the subordinal pre-release version may have an arbitrary number of terms (i.e., "–Term1.Term2.Term3"). When a pre-release version has a wildcard appended to the end of a valid pre-release version term (i.e., example 12 of Table 2), it may set the subordinal selection strategy to seek a higher subordinal value without constraining prior terms. However, if a wildcard is used at the end of a pre-release version as the last term (i.e., ".*" as in an example 13 of Table 2), all terms prior to the wildcard term are constrained. Thus, for example, the version 3.6.0-beta may be accepted by example 12 of Table 2, however, may be rejected by example 13 of Table 2, which may have an upper subordinal bound of "alpha.3.∞".

In some embodiments, the system 110 via the unification engine 214 may determine rights deficiency for the final unified version to validate licensing requirements associated with the unified version based on a prestored licensing rules. Further, the system 110 via the unification engine 214 may

TABLE 2

| Example No. | Dependency Notation | A | Ω | E | α | ω | ε |
|---|---|---|---|---|---|---|---|
| 1 | 1.0.0 | (1, 0, 0, T) | (∞, ∞, ∞, T) | F | (∞, F) | (∞, F) | F |
| 2 | 1.* | (1, 0, 0, T) | (1, ∞, ∞, T) | T | (∞, F) | (∞, F) | F |
| 3 | 1.4.* | (1, 4, 0, T) | (1, 4, ∞, T) | T | (∞, F) | (∞, F) | F |
| 4 | 1.4.5* | (1, 4, 5, T) | (1, 4, ∞, T) | T | (∞, F) | (∞, F) | F |
| 5 | [1.4.0, 1.5.0)* | (1, 4, 0, T) | (1, 5, 0, F) | T | (∞, F) | (∞, F) | F |
| 6 | [1.0.0, 2.0.5) | (1, 0, 0, T) | (2, 0, 5, F) | F | (∞, F) | (∞, F) | F |
| 7 | [1.0.0, 2.0.5)* | (1, 0, 0, T) | (2, 0, 5, F) | T | (∞, F) | (∞, F) | F |
| 8 | 3.6.0-alpha | (3, 6, 0, T) | (∞, ∞, ∞, T) | F | ("alpha", T) | (∞, T) | F |
| 9 | 3.6.0-[alpha-beta)* | (3, 6, 0, T) | (∞, ∞, ∞, T) | F | ("alpha", T) | ("beta", F) | T |
| 10 | 3.6.0-alpha* | (3, 6, 0, T) | (∞, ∞, ∞, T) | F | ("alpha", T) | (∞, T) | T |
| 11 | 3.6.0-alpha.* | (3, 6, 0, T) | (∞, ∞, ∞, T) | F | ("alpha.0", T) | ("alpha.∞", T) | T |
| 12 | 3.6.0-alpha.3* | (3, 6, 0, T) | (∞, ∞, ∞, T) | F | ("alpha.3", T) | (∞, T) | T |
| 13 | 3.6.0-alpha.3.* | (3, 6, 0, T) | (∞, ∞, ∞, T) | F | ("alpha.3.0", T) | ("alpha.3.∞", T) | T |

In the above Table 2, considering example 8 which includes ("3.6.0-alpha"), the unified result may use a subordinal selection strategy of finding the lowest subordinal, overriding other dependencies on this package that call for a highest subordinal selection strategy. Thus, it may always be the scenario, that a wildcard may be used for the subordinal pre-release dependency notation. The dependency notation "3.6.0-alpha*" may be considered more appropriate dependency notation than just "3.6.0", which excludes pre-release versions, if the package version forming the dependency notation may have been tested and worked with pre-release versions alpha and later of the dependency. This is because it expresses the preference for non-pre-release package versions, while also expressing its compatibility with some pre-release versions, thus making it more forgiving in terms of unification. The goal when making dependency notations may describe interoperability in the most forgiving terms as possible, to avoid unification conflicts with other packages. The wildcard notation in example 3, ("1.4.*") of Table 2 may be a short-hand notation for constraining the first two terms of the ordinal version generate a set of recommendations to acquire required licenses for the one or more packages, when the validated licensing requirements associated with the final unified version is not satisfied. Furthermore, the system 110 via the unification engine 214 may install the final unified version of the one or more packages into an installation target location which is independent of other installation target locations, based on acquiring the required licenses. The installation target location may be in the first computing device 104. Each of the installation target locations are independent with respect to one or more packages installed into the each of the installation target locations.

Figure 6A:
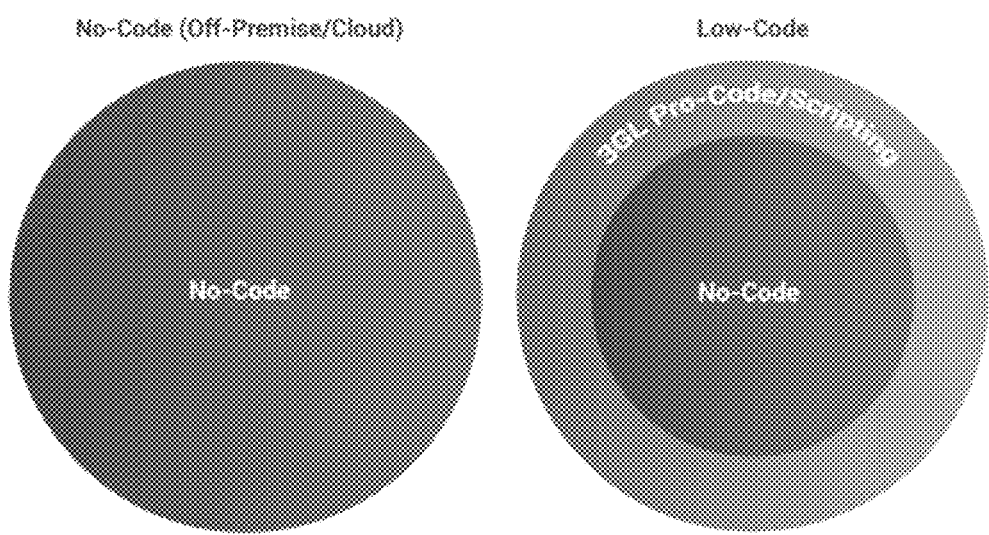
FIG. 6A illustrates an exemplary cross-sectional representation of traditional no-code and low code software platforms, in accordance with embodiments of the present disclosure.
Figure 6B:
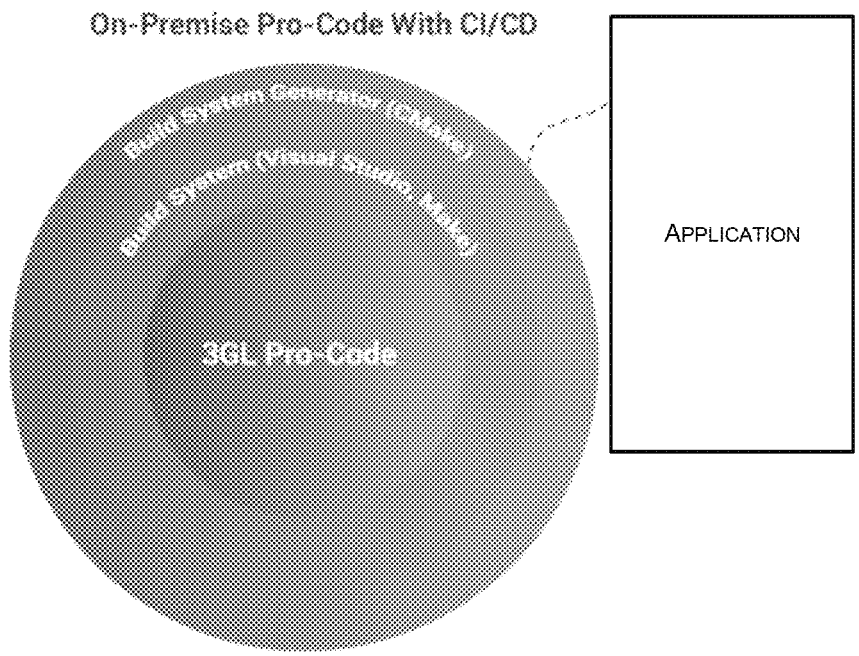
FIG. 6B illustrates an exemplary cross-sectional representation of a traditional software development platform by professional programmers, in accordance with embodiments of the present disclosure.

For example, the FIG. 6A may depict conceptually that the cross sections of typical "no-code" and "low-code" software platforms, in terms of what is available to the entity 114 such as content provider. No-code platforms may simply offer a no-code design environment, whereas low-code may offer no-code-like high levels of abstraction, with some ability to either do custom scripting or third-generation language (3GL) programming. In the "no-code" and "low-code" platforms, the entity 114 may have no access to the underlying build systems or design time environments. Further, modern professional software development workflows in the entity 114 may have a technology cross section as shown in FIG. 6B. The software developers/professional programmers associated with the entity 114 may use 3GL pro-code programming. Further, in contrast to the above traditional no-code and low-code platforms above, the software developers may have access to the native build systems, build system generators. Additionally, whereas the users of the "no-code" and "low-code" platforms such as the entity 114 may only have access to the (typically cloud) run-time and the users of the 3GL pro-code programming such as the entity 114 may have access to both the design-time and runtime environments. These differences may create vendor lock-in, and dramatically limit the openness and flexibility of the "no-code" and "low-code" platforms compared to the development environments such as the 3GL pro-code programming.

Figure 6C:
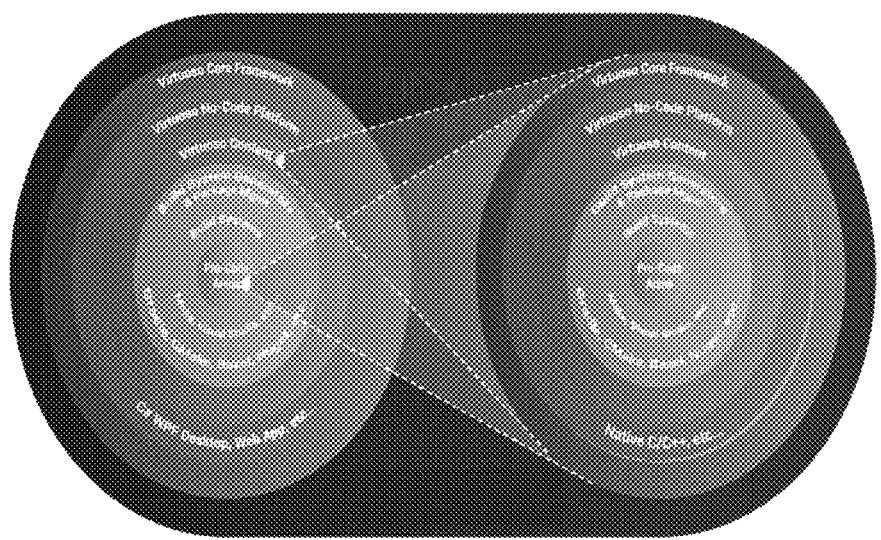
FIG. 6C illustrates an exemplary cross-sectional representation of a software ecosystems with no-code platform that retains the underlying native 3GL pro-code workflow, including build system generators and build systems, with the support of a digital economy infrastructure, in accordance with embodiments of the present disclosure.

Further, the no/low-code platforms may offer a faster path to market, however, there may be a vendor lock-in, usage fees, architectural limitations, and lack of openness and extensibility. On the other hand, the conventional approach to software development may have essentially unlimited flexibility and openness, however, may involve much higher levels of effort and longer time to market. The system 110 may provide the technology infrastructure to support software ecosystems such as Virtuoso®, an embedded system virtual device framework available from Embeddetech, Inc, of Tulsa, Oklahoma Virtuoso® may combine the benefits of both technologies such as no/low-code and 3GL pro-code programming, without the weaknesses, while also providing the support for a digital economy as shown in FIG. 6C. The system 110 may provide coordination of package distribution and licensing across multiple merchants. No-code orchestration of software package compositions, including underlying build systems, creates a radically scalable, extensible environment. The no-code platforms that are possible as a result of this invention are more flexible and open than any existing no-code or low-code platform, which offered as a monolithic software-as-a-service solution. The system 110 may enable a super workflow that is open to content development by a community supported by powerful package licensing and distribution infrastructure. Users of the platform benefit from effortless no-code composition of software, while allowing professional developers to extend applications using the underlying build systems, and with no vendor lock-in. Using the system 110, Virtuoso® may be able to create a no-code platform that may retain the underlying native 3GL pro-code workflow, including build system generators and build systems. This may be a requirement for a software ecosystem that may be truly open and extensible to new content. Further, users of the Virtuoso® no-code platform may disregard the underlying build systems and 3GL workflow, if the needs may be satisfied by the available no-code content. The system 110 may provide such flexibility that a single package in one no-code design may represent a separate no-code design which may have completely different platform type, build system, and 3GL. This may be the exact requirement for the ideal embedded hardware virtualization environment, which may require different platforms, build systems, and 3GLs for the target software development environment and the hosting virtual environment.

The system 110 may outline the power and flexibility of the package management, by considering that the package management may combine with flexible licensing in the context of composability. For example, in conventional approach, an entity may have developed a powerful software library which the entity 114 may need to release to the market and considering that the developed software library may use a highly specialized third-party library that may also require a license to be purchased. The entity might be able to make easy for someone to buy and use software library/third-party library, however the entity may not have the rights to distribute the third-party library. Therefore, the entity may have to provide detailed instructions for how the user needs to go to the third-party's website, buy the product and download the library. The user in the conventional approach may need to go through the process of activating the third-party license using a completely different process. The system 110 of the embodiments herein may implement unified one or more packages for installation. The users 102 of the embodiments herein, may view software library in the software ecosystem and may request to install the software library associated with the software package. The system 110 may evaluate the right deficiencies (license claim deficiencies) for the entire dependency graph and may clearly present the set of options available to pay for all the licenses of the software library, in a single interaction. The users 102 may buy products together and the software packages may be correctly installed. The third-party merchant associated with the third-party license may find useful, since, the entity 114 may be functioning as a channel partner on behalf of the third-party merchant. Further, the entity 114 may effortlessly build on top of the existing work and monetize. Furthermore, the user 102 may find hassle-free due to the unified solution.

For instance, the "license claim" may be simply a verified statement that may be offered to a software package by a "claim issuer". All the license claims may have an underlying "claim type", such as a Boolean claim type, that states a value as true or false, a date time claim type that states a date and time, an integer or double-precision number claim type, an End-User License Agreement (EULA) acceptance claim type, a string claim type. Further, each license claim may be issued by the claim issuer with specific semantic meaning, which may have the characteristics, such as, specific claim type, issued due to a number of occurrences, such as the acceptance of the EULA, the purchase of a product and/or activation of a license, a self-attestation. Further, the "license claim" may define the existence of the specific claim with specific contextual meaning, and a "claim grant" of a specific "license claim" which may be granted to the user 102. For instance, it may be the responsibility of the software packages that accept the claim grant to understand the contextual meaning of the underlying claim. For example, the system 110 may issue EULA acceptance claim grants to the user 102 when the user 102 accepts the EULA. The system 110 may provide the interaction to the user 102 to view the EULA and accept the EULA. Upon acceptance, the license claim may be granted to the user 102, and the entity 114 may choose to accept the license claim grant based on the trust regarding the underlying claim. The system 110 may also issue "self-attestation" claim grants which is provided by the user of the software package, such as date of birth, country of origin, or user type (i.e., commercial or non-commercial/educational). These basic license claims may have inherent contextual meaning that the entity 114 accurately understands and accepts, for example, that the user 102 is the one attesting to the license claim, not entity 114. Whereas the basic country of origin self-attestation claim grant may be sufficient for basic policies, it may not be appropriate for, for example, an International Traffic and Arms (ITAR) related policy. For that, a third-party issuer could provide more comprehensively vetted claims regarding the nationality of the user 102. Further, the claim grants may be the basis for policies, whether the policy is related to whether the software library should be allowed to be downloaded, whether the software library (or a feature inside the library) should be allowed to run, or the pricing policy (i.e., whether to discount for an educational user or charge the full amount for a commercial user). The policy may be defined as a Boolean expression that evaluates true or false. If the policy evaluates to true, the policy is satisfied and if the policy evaluates to false, the policy is not satisfied. The Boolean expression may be any normal Boolean expression, for example, (X and ((not Y) or Z)). Here, the X, Y, and Z terms may be Boolean values, or expressions that evaluate to Boolean results. Each of the X, Y, and Z terms used in the policy may be a "claim requirements". The claim requirements may be regarding how the claim grant of a specific claim type is converted to a Boolean. For example, the system 110 may issue the claim grant to the user 102, that the date of birth is Aug. 23, 1980, based on self-attestation. This may be the claim grant issued by the system 110 that the entity 114 may use to compose the policy, without having to do any of the development work to get the claim grant. The system 110 may create the claim requirement, for example, requires that the user 102 is at least 18 years old. This specific claim requirement may have characteristics such as operates on a specific claim of claim type "Date Time", requires a threshold, in this case the minimum age, evaluates result by taking the user's age, which may be derived from the user's self-attested "Date of Birth" claim, and comparing to the threshold provided by the merchant. Further, claim grants, in general, may need to be "reduced" as part of the claim requirement evaluation, and the reduction method may be prescribed by the claim requirement type. For example, different products could be sold that issue claims regarding a limit to some software function, for example an integer number that means the maximum times a package can run. Multiple products may be sold that offer different claim numbers, and the user 102 may have activated multiple licenses simultaneously. For example, one product allows three instances, and another product allows ten instances. In this scenario, the user 102 may have two claim grants of the same claim type (integer). The claim requirement may function as, the claim grant of the specified claim may be reduced by taking the maximum value. The reduced claim grant value may be compared against the actual number of instances the user is trying to use. If the claim grant value may be greater than or equal to the number of instances, the claim requirement may evaluate to true; otherwise, evaluates false. In this manner, the entity 114 may be able to flexibly create arbitrary policies based on claim requirements, and the system 110 may provide the user 102 with interactions on demand to resolve missing claim grants that are needed to evaluate the policy.

Further, the claim grants may be granted or revoked by the system 110 when user 102 accepts EULAs (granted), activates the license grant, self-attests facts such as age, date of birth, country of origin user type (educational/commercial), etc., releases the license (for floating, claim grants revoked). Further, the software license grant may be akin to a software license. Further, software license definition may define a set of claims that may be granted to the user 102, when the software license grant of the underlying software license definition may be activated. The software license grant may be granted to the user 102, when the user 102 purchases products, which indicate one or more software license definitions. The technique of creating claims, EULAs, software license definitions, and products may be on a website associated with the system 110, in the "back-end" login page associated with the entity 114. However, the software package itself, must be deployed on-site, to the one or more computing devices 104, and installed properly. A licensing enforcement in the software may be as, the software package requests encrypted claim grants from a launcher associated with the system 110, a software service that runs locally on the one or more computing devices 104. This request is made using a provided library. The claim grants may be requested for a "claim store", which stores all claims granted to the user 102 which is included in the software package. All the claims from the claim store may be encrypted with an encrypted key, and may be decrypted with a key associated with the entity 114. Further, the software package may receive the encrypted claims and uses the software library provided by the system 110 to evaluate the policy, and returns true or false depending on whether the policy succeeded or failed based on all available claim grants. The policy may be either be created in-situ by the software package, or the policy could also come from the claim store by a request to fetch it using the launcher associated with the system 110. If the policy may be fetched from the claim store, then the flexibility may be added so that the entity 114 may be able to change the policy even after the package has already been deployed to the one or more computing devices 104. The policy may be similarly encrypted and digitally signed, so that both the policy and the claim grants may be securely transmitted end-to-end. Even the launcher associated with the system 110 may not be aware regarding the claim grant and policy tickets.

Figure 7:
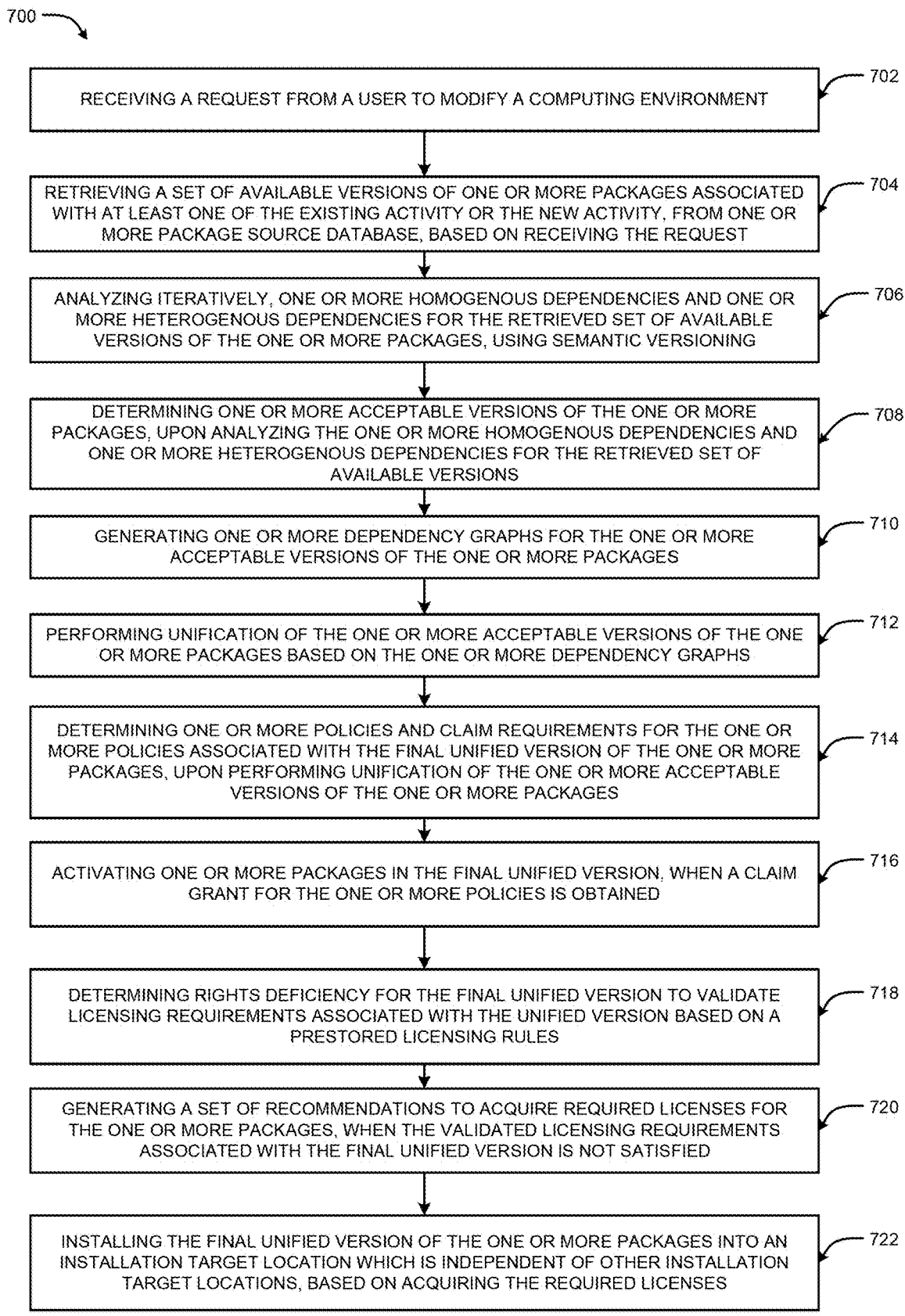
FIG. 7 illustrates exemplary method flow chart depicting a method for managing unification of plurality of concurrent activities in a computing environment, in accordance with embodiments of the present disclosure.

FIG. 7 illustrates exemplary method flow chart depicting a method 700 for managing unification of plurality of concurrent activities in a computing environment, in accordance with an embodiment of the present disclosure.

As illustrated in FIG. 7, the method 700 may include one or more blocks illustrating a method 700 of managing of unification of plurality of concurrent activities in a computing environment. The method 700 may be described in the general context of computer-executable instructions. Generally, computer-executable instructions can include routines, programs, objects, components, data structures, procedures, modules, and functions, which perform functions or implement abstract data types.

The order in which the method 700 is described is not intended to be construed as a limitation, and any number of the described method blocks can be combined in any order to implement the method 700. Additionally, individual blocks may be deleted from the methods without departing from the scope of the subject matter described herein. Furthermore, the method 700 can be implemented in any suitable hardware, software, firmware, or combination thereof.

At block 702, the method 700 may include receiving, by the processor 202, a request from a user to modify a computing environment. At block 704, the method 700 may include retrieving, by the processor 202, a set of available versions of one or more packages associated with at least one of the existing activity or the new activity, from one or more package source database 116, based on receiving the request. At block 706, the method 700 may include analyzing iteratively, by the processor 202, one or more homogenous dependencies and one or more heterogenous dependencies for the retrieved set of available versions of the one or more packages, using semantic versioning.

At block 708, the method 700 may include determining, by the processor 202, one or more acceptable versions of the one or more packages, upon analyzing the one or more homogenous dependencies and one or more heterogenous dependencies for the retrieved set of available versions. At block 710, the method 700 may include generating, by the processor 202, one or more dependency graphs for the one or more acceptable versions of the one or more packages.

At block 712, the method 700 may include performing, by the processor 202, unification of the one or more acceptable versions of the one or more packages based on the one or more dependency graphs. At block 714, the method 700 may include determining, by the processor 202, one or more policies and claim requirements for the one or more policies associated with the final unified version of the one or more packages, upon performing unification of the one or more acceptable versions of the one or more packages.

At block 716, the method 700 may include activating, by the processor 202, one or more packages in the final unified version, when a claim grant for the one or more policies is obtained. At block 718, the method 700 may include determining, by the processor 202, rights deficiency for the final unified version to validate licensing requirements associated with the unified version based on a prestored licensing rules. At block 720, the method 700 may include generating, by the processor 202, a set of recommendations to acquire required licenses for the one or more packages, when the validated licensing requirements associated with the final unified version is not satisfied. At block 722, the method 700 may include installing, by the processor 202, the final unified version of the one or more packages into an installation target location which is independent of other installation target locations, based on acquiring the required licenses.

Figure 8:
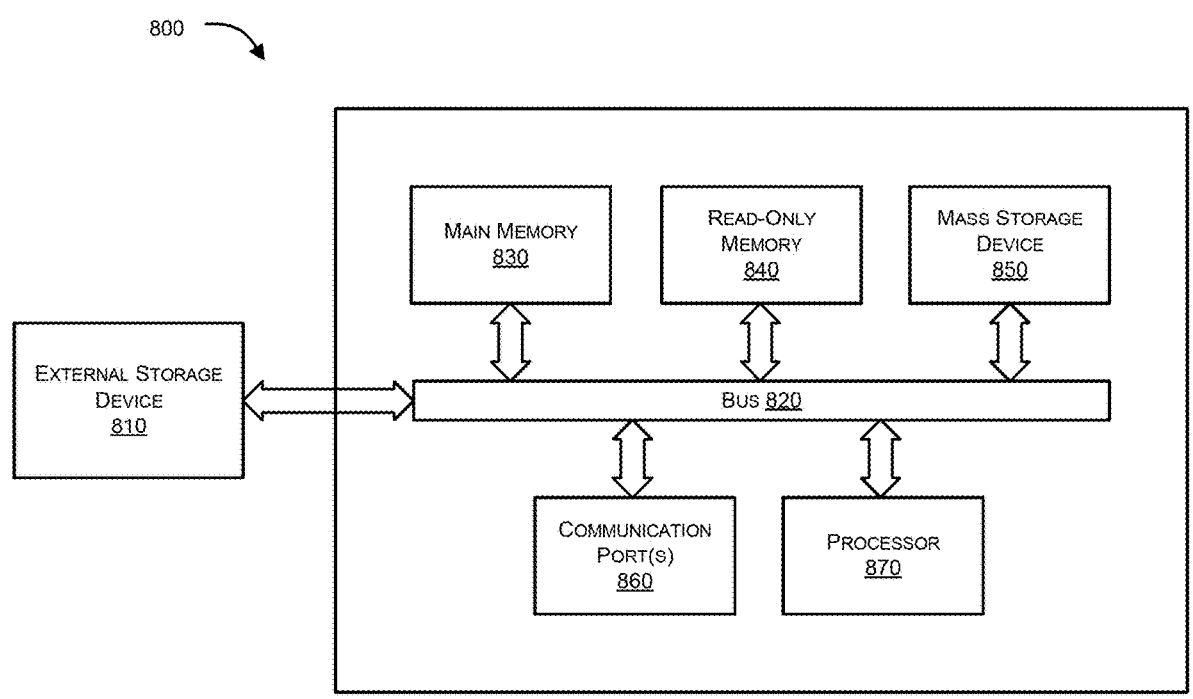
FIG. 8 illustrates an exemplary computer system in which or with which embodiments of the present invention can be utilized, in accordance with embodiments of the present disclosure.

FIG. 8 illustrates an exemplary computer system 800 in which or with which embodiments of the present invention can be utilized in accordance with embodiments of the present disclosure. As shown in FIG. 8, computer system 800 can include an external storage device 810, a bus 820, a main memory 830, a read only memory 840, a mass storage device 850, communication port 860, and a processor 870. A person skilled in the art will appreciate that the computer system may include more than one processor and communication ports. Examples of processor 870 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 870 may include various modules associated with embodiments of the present invention. Communication port 860 can be any of an RS-232 port for use with a modem-based dialup connection, a 10/100 Ethernet port, a Gigabit or 10 Gigabit port using copper or fiber, a serial port, a parallel port, or other existing or future ports. Communication port 860 may be chosen depending on a network, such a Local Area Network (LAN), Wide Area Network (WAN), or any network to which computer system connects. Memory 830 can be Random Access Memory (RAM), or any other dynamic storage device commonly known in the art. Read-only memory 840 can be any static storage device(s) e.g., but not limited to, a Programmable Read Only Memory (PROM) chips for storing static information e.g., start-up or BIOS instructions for processor 870. Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 13K800), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 820 communicatively couple processor(s) 870 with the other memory, storage and communication blocks. Bus 820 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 870 to software system.

Optionally, operator and administrative interfaces, e.g., a display, keyboard, and a cursor control device, may also be coupled to bus 820 to support direct operator interaction with a computer system. Other operator and administrative interfaces can be provided through network connections connected through communication port 860. The external storage device 810 can be any kind of external hard-drives, floppy drives, IOMEGA® Zip Drives, Compact Disc—Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Embodiments of the present disclosure provides a robust, improved and flexible method and system for implementing a unified component installation such as software packages. Embodiments herein improves package management and delivers more reliable and correct package unification and dependency closure, by extending semantic versioning with a semantic version dependency notation. Embodiments herein improves the software package licensing using a claims-based licensing technique that delivers more licensing flexibility with less effort. Embodiments herein are designed with marketplace intent, to function as a central management point for licenses both for software vendors and for the users. Embodiments herein combine unification of one or more components and the claims-based licensing technique to create an infrastructure platform that supports the emergence of a composable business architecture and a digital economy. Embodiments herein provide an ecosystem content which is completely open so that anyone can develop and contribute content and find a marketplace where products can compete and be discovered. The ecosystem content integration into the solution may be effortless and automatic and the ecosystem content can build off of other ecosystem content, creating hierarchical complexities in terms of installation. Embodiments herein increase the flexibility and expressiveness for software vendors/content providers to create policies and lowers the level of effort that ecosystems and software vendors/content providers are burdened with to assist users in resolving licensing issues. Embodiments herein supports composable software systems, that is software systems that can require licensing from multiple third-party vendors to be satisfied simultaneously for the system to work. Embodiments herein creates crosscutting value-added benefits, such as Export Administration Regulations (EARs) and International Traffic in Arms Regulations (ITARs) compliance infrastructure, or Department of Defense Authority To Operate (ATO) infrastructure, in which package authors can leverage trusted policies that ensure proper handling of packages that have legal distribution restrictions. Embodiments of the present disclosure further provides cost-cutting value-added benefits, such as security infrastructure in which package authors leverage infrastructure security testing and verification, and certification. Embodiments herein, not only manages the licensing requirement, but also supports digital product creation.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

The above description of composable software architecture applies to software, of course, but importantly applies to the integration of software-controlled hardware to create project solutions involving hardware, and extension of the capabilities of that hardware from what is otherwise available. Consider, for example, a capability that is needed in a computing system, but is not available with the system as currently configured. The capability could be pure software, licensed hardware designs such as licensed microprocessor intellectual property that can be incorporated into a hardware design, or hardware that can be integrated through software (sensors, actuators, etc.). Each capability may be available in an open marketplace, which can be used directly in an end solution, or which can be used to compose a higher-level capability on a graph of capabilities. Importantly, these graph-forming capabilities are provided using a technology that fully self-describes how the capability can be integrated into a hardware/software solution on the fly, as well as the licensing needs for each capability.

Once a system level solution has been identified to meet requirements, an entire graph of hardware and software capabilities can be resolved, including exact versions of each capability, a use can be presented with a bill of materials and usage policies from all vendors providing capabilities involved in the solution. The usage policies may include licensed product purchase requirements which involve many steps to resolve, for example: "there are four products which provide licenses to satisfy the requirements of this capability, you must purchase one of them, then activate the policy, then use the license on this device." Other usage policies defined by the capability provider may relate to other requirements, for example "the user must be at least 18 years old," or "the user must be a citizen of an ally country." Those usage policies would be "non-resolvable" if the user fails to meet the requirements of the policy—no action could be taken to resolve the policy. If the system responsible for evaluation of the policies isn't able to evaluate the policy, for example the system doesn't know the user's age, then a resolution step could be to determine the person's date of birth. Then after the date of birth is established, the policy can be created.

Other policies are easily resolvable, for example, "to use this policy, you must accept this agreement": resolution of the policy involves prompting the user to accept the agreement. In various embodiments, the system is able to ignore capabilities that are non-resolvable and identify a complete solution that meets the requirements. The use may be prompted with actions that need to be taken to resolve policies to meet the requirements of the entire solution.

This example provides a quick conceptual reference for a system capable of rapidly building complex hardware and software systems, which we have extended by identifying the importance for a technology to enable the modularity, discoverability, orchestration, and autonomy of complex solution synthesis which are composed from a hierarchy of hardware and software capabilities. The hierarchical digital economy of composable hardware and software can be key to unlocking radical improvements in production.

The Applicant's research has shown that complex systems design including both hardware and software has traditionally succumbed to a situation known as "Baumol's cost disease", which describes exploding costs to goods and services, such as the creation of complex systems, as an inability to increase productivity in that good or service category. The intractable nature of this problem, at its heart, is an inability to orchestrate and resolve the transaction costs associated with the integration of the capabilities in a capability supply chain that is driven by market pricing. The lack of technology to solve economic problems is further explained in economist and Nobel laureate Ronald Coase's seminal paper titled "The Nature of the Firm", where he identifies transaction costs as the key economic driver of the means and productivity of evolving economies of production.

One specific use case example will be provided, drawing from our economic research, to solidify the importance of the invention of the present disclosure. A quality shirt can be bought at a store at extremely low price, considering the complexity that goes into making the shirt. The shirt may be made in Malaysia using German machines from cloth woven in India using cotton grown in the United States. This chain of production is organized by market prices at each step of the supply chain. In each step, the vendor sources source materials from an open marketplace, with each market representing enormous economic computation. The top-level economic choice of an individual acting on a market price, the choice to choose a shirt at a store, activates what Ronald Coase describes as an "sea of unconscious [economic computing] power". Where deep supply chains driven by market prices through the actions of individual actors can't be formed, only large firms undertaking great uncertainty can overcome the enormous transaction cost. A classic example is Elon Musk creating SpaceX to build vertical take-off and landing space launch, to completely revolutionize space travel.

We consider one specific use case which follows a general situation: a problem exists that could be easily solved by a solution involving hardware and software, but the cost of hiring subject matter experts (hardware and software engineers) to create the solution is cost prohibitive. In our use case, we consider a production engineer setting up an automated production process for an assembly line. An assembly worker needs to be clearly prompted to take source material, place them in a configuration, perform a production operation like thermoplastic heat staking, then place the work product on a conveyor belt. Hiring a team of engineers to implement the solution is cost prohibitive. Using the invention of the present disclosure, a marketplace of composable hardware and software capabilities provides the production engineer with all the capabilities they need to rapidly compose the solution. A camera is mounted above the work station. A vision recognition capability is effortlessly integrated with the camera in a single environment requiring no programming expertise, because the capabilities leverage our technology. In this single environment, the production engineer trains the vision recognition capability to classify stages of the production operation: first placing the work product in a fixture, then taking other source materials from the correct bins, creating the assembly, performing the heat stake operation, detecting whether the operator's hands are in the designated location during the heat staking process to ensure no injuries, then removing the work product and placing it on the conveyor belt. The trained vision recognition system then exposes the output of the state of the operator, where the production engineer can then compose then with other capabilities. Lights to illuminate the correct bin to pull the next part from, actuators to move parts into place, sensors to detect that both hands are away from the hazard area, and audio feedback to instruct the operator.

The entire production setup, which would normally take at least several tens of thousands of dollars, could be created from composable capabilities in under an hour. Each capability in this example has absolutely no knowledge of other capabilities, and the integration of the capabilities together to form a higher order solution can be seen to be a fundamental technical and business problem of each sourced capability. The camera capability and the vision recognition system capability must use shared software that defines the interoperability between the two capabilities using libraries that evolve and change over time. The composition of the capabilities must consider which versions of which library each capability supports, and automate the library selection and orchestration of the capabilities, without requiring the end user to have any understanding of these technical details. However, in our disclosed invention, the creation of the solution would be and end-to-end hardware and software solution, with full source code orchestrated and created for the production engineer. They would then have the ability to extend the orchestration and autonomy provided by our invention with their own professional software programming or hardware design. In this way, the invention supports rapid composable hardware and software that does not require hardware or programming expertise, but also provides unlimited flexibility in further tailoring the solution to the application needs through professional engineering.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method for managing unification of plurality of concurrent activities in a computing environment, comprising:

receiving, by a processor, a request from a user to modify a computing environment, wherein the request comprises at least one of a root installation request for a package associated with an existing activity in the computing environment or a plurality of root installation requests associated with a new activity in the computing environment;

retrieving, by the processor, a set of available versions of one or more packages associated with at least one of the existing activity or the new activity, from one or more package source database, based on receiving the request;

analyzing iteratively, by the processor, one or more homogenous dependencies and one or more heterogenous dependencies for the retrieved set of available versions of the one or more packages, using semantic versioning;

determining, by the processor, one or more acceptable versions of the one or more packages, upon analyzing the one or more homogenous dependencies and one or more heterogenous dependencies for the retrieved set of available versions, wherein the one or more acceptable versions are determined based on analyzing one or more dependency notations associated with the one or more packages and determining one or more final versions to be installed from the one or more acceptable versions of the one or more packages, from the analyzed one or more dependency notations;

generating, by the processor, one or more dependency graphs for the one or more acceptable versions of the one or more packages, wherein generating the one or more dependency graphs comprises forming one or more product dependency graphs and one or more package dependency graphs to use one or more packages associated with at least one of the existing activity or the new activity;

performing, by the processor, unification of the one or more acceptable versions of the one or more packages based on the one or more dependency graphs, wherein a final unified version of the one or more packages is selected based on analyzing one or more primary ordinal directions and one or more subordinal directions of dependencies associated with the one or more acceptable versions of the one or more packages;

determining, by the processor, one or more policies and claim requirements for the one or more policies associated with the final unified version of the one or more packages, upon performing unification of the one or more acceptable versions of the one or more packages, wherein the unification of the one or more acceptable versions of the one or more packages is not affected by deficiencies in the one or more policies;

activating, by the processor, one or more packages in the final unified version, when a claim grant for the one or more policies is obtained;

determining, by the processor, rights deficiency for the final unified version to validate licensing requirements associated with the final unified version based on a prestored licensing rules;

generating, by the processor, a set of recommendations to acquire required licenses for the one or more packages, when the validated licensing requirements associated with the final unified version is not satisfied; and wherein when performing the unification of the one or more acceptable versions of the one or more packages, if the unification is not successful due to multiple dependency requirements, then the unification results in unification error or the one or more acceptable versions of the one or more packages are installed side by side into a cache to install the final unified version of the one or more packages from the cache into an installation target location, based on acquiring the required licenses;

installing, by the processor, the final unified version of the one or more packages into the installation target location which is independent of other installation target locations, based on acquiring the required licenses, wherein each of the installation target locations are independent with respect to one or more packages installed into the each of the installation target locations.

2. The method as claimed in claim 1, wherein installing side by side comprises multiple versions of a same package to be installed to the installation target location, and wherein installing the final unified version comprises one version of a package to be installed to the installation target location.

3. The method as claimed in claim 1, wherein one or more homogenous dependencies comprise one package dependency with another package in the same installation target location, and wherein one or more heterogenous dependencies comprise packages in different installation target locations from the installation target location of an original package.

4. The method as claimed in claim 1, wherein the semantic versioning comprises at least one of a major version, a minor version, a patch version, an optional pre-release version, and an optional descriptive build version which does not affect ordinality or unification results.

5. The method as claimed in claim 1, wherein determining the one or more acceptable versions of the one or more packages for the set of available versions, further comprises:
selecting, by the processor, based on a pre-defined preference associated with the one or more acceptable versions of the one or more packages, wherein the pre-defined preference comprises preferencing at least one of lower major versions over higher major versions, lower minor versions over higher minor versions, lower patch versions over higher patch versions, and lower pre-release versions over higher pre-release versions.

6. The method as claimed in claim 3 further comprising:
evaluating, by the processor, a dependency notation of a pre-release version independently of at least one of a dependency notation of a normal version which comprises a set of at least one of a dependency notation of a major version, a dependency notation of a minor version, and a dependency notation of a patch version, wherein the dependency notation of the major version, the dependency notation of the minor version, and the dependency notation of the patch version form one or more primary ordinal directions.

7. The method as claimed in claim 5 further comprising:
overriding, by the processor, the pre-defined preference using a wild card for the one or more acceptable versions of the one or more packages; and
selecting, by the processor, higher versions over lowest versions.

8. The method as claimed in claim 1, wherein the one or more dependency notations further comprise an interval dependency notation.

9. The method as claimed in claim 1, wherein performing, by the processor, the unification of the one or more acceptable versions of the one or more packages based on the one or more dependency graphs, further comprises:

inputting, by the processor, each stage of unification result in the one or more dependency graphs to a dependency operator; and applying, by the processing, an operation of the dependency operator to provide each stage of unification result as an output to a subsequent dependency operator in the one or more dependency graphs.

10. The method as claimed in claim 1, wherein the claim grant is transmitted to the computing environment whenever claim grants from an associated claim store are requested, wherein the claim grant is only be transmitted to the computing environment when specifically requested for the claim store.

11. A system for managing unification of plurality of concurrent activities in a computing environment, comprising:
a processor;
a memory, wherein the memory comprises processor executable instructions, which on execution causes the processor to:
receive a request from a user to modify a computing environment, wherein the request comprises at least one of a root installation request for a package associated with an existing activity in the computing environment or a plurality of root installation requests associated with a new activity in the computing environment;
retrieve a set of available versions of one or more packages associated with at least one of the existing activity or the new activity, from one or more package source database, based on receiving the request;
analyze iteratively one or more homogenous dependencies and one or more heterogenous dependencies for the retrieved set of available versions of the one or more packages, using semantic versioning;
determine one or more acceptable versions of the one or more packages, upon analyzing the one or more homogenous dependencies and one or more heterogenous dependencies for the retrieved set of available versions, wherein the one or more acceptable versions are determined based on analyzing one or more dependency notations associated with the one or more packages and determining one or more final versions to be installed from the one or more acceptable versions of the one or more packages, from the analyzed one or more dependency notations;
generate one or more dependency graphs for the one or more acceptable versions of the one or more packages, wherein generating the one or more dependency graphs comprises forming one or more product dependency graphs and one or more package dependency graphs to use one or more packages associated with at least one of the existing activity or the new activity;
perform unification of the one or more acceptable versions of the one or more packages based on the one or more dependency graphs, wherein a final unified version of the one or more packages is selected based on analyzing one or more primary ordinal directions and one or more subordinal directions of dependencies associated with the one or more acceptable versions of the one or more packages;
determine one or more policies and claim requirements for the one or more policies associated with the final unified version of the one or more packages, upon performing unification of the one or more acceptable versions of the one or more packages, wherein the unification of the one or more acceptable versions of the one or more packages is not affected by deficiencies in the one or more policies;
activate one or more packages in the final unified version, when a claim grant for the one or more policies is obtained;
determine, by the processor, rights deficiency for the final unified version to validate licensing requirements associated with the final unified version based on a pre-stored licensing rules;
generate a set of recommendations to acquire required licenses for the one or more packages, when the validated licensing requirements associated with the final unified version is not satisfied;
wherein when performing the unification of the one or more acceptable versions of the one or more packages, if the unification is not successful due to multiple dependency requirements, then the unification results in unification error or the one or more acceptable versions of the one or more packages are installed side by side into a cache to install the final unified version of the one or more packages from the cache into an installation target location, based on acquiring the required licenses;
and
install the final unified version of the one or more packages into the installation target location which is independent of other installation target locations, based on acquiring the required licenses, wherein each of the installation target locations are independent with respect to one or more packages installed into the each of the installation target locations.

12. The system as claimed in claim 11, wherein installing side by side comprises multiple versions of a same package to be installed to the installation target location, and wherein installing the final unified version comprises one version of a package to be installed to the installation target location.

13. The system as claimed in claim 11, wherein one or more homogenous dependencies comprise one package dependency with another package in the same installation target location, and wherein one or more heterogenous dependencies comprise packages in different installation target locations from the installation target location of an original package.

14. The system as claimed in claim 11, wherein the semantic versioning comprises at least one of a major version, a minor version, pre-release version, a build version, and a patch version.

15. The system as claimed in claim 11, wherein, for determining the one or more acceptable versions of the one or more packages for the set of available versions, the processor is further configured to:
select, based on a pre-defined preference associated with the one or more acceptable versions of the one or more packages, wherein the pre-defined preference comprises preferencing at least one of lower major versions over higher major versions, lower minor versions over higher minor versions, lower patch versions over higher patch versions, and lower pre-release versions over higher pre-release versions.

16. The system as claimed in claim 13, wherein the processor is further configured to:
evaluate a dependency notation of a pre-release version independently of at least one of a dependency notation of a normal version which comprises a set of at least one of a dependency notation of a major version, a dependency notation of a minor version, and a dependency notation of a patch version, wherein the dependency notation of the major version, the dependency notation of the minor version, and the dependency notation of the patch version form one or more primary ordinal directions.

17. The system as claimed in claim 15, wherein the processor is further configured to:
override the pre-defined preference using a wild card for the one or more acceptable versions of the one or more packages; and select higher versions over lowest versions.

18. The system as claimed in claim 11, wherein the one or more dependency notations further
comprise an interval dependency notation.

19. The system as claimed in claim 11, wherein for performing the unification of the one or more acceptable versions of the one or more packages based on the one or more dependency graphs, the processor is further configured to: input each stage of unification result in the one or more dependency graphs to a dependency operator; and apply an operation of the dependency operator to provide each stage of unification result as an output to subsequent dependency operator in the one or more dependency graphs.

20. The system as claimed in claim 11, wherein the claim grant is transmitted to the computing environment whenever claim grants from an associated claim store are requested, wherein the claim grant is only be transmitted to the computing environment when specifically requested for the claim store.

21. A non-transitory computer readable storage medium comprising machine executable instructions that may be executable by a processor to:
receive a request from a user to modify a computing environment, wherein the request comprises at least one of a root installation request for a package associated with an existing activity in the computing environment or a plurality of root installation requests associated with a new activity in the computing environment;
retrieve a set of available versions of one or more packages associated with at least one of the existing activity or the new activity, from one or more package source database, based on receiving the request; analyze iteratively one or more homogenous dependencies and one or more heterogenous dependencies for the retrieved set of available versions of the one or more packages, using semantic versioning;
determine one or more acceptable versions of the one or more packages, upon analyzing the one or more homogenous dependencies and one or more heterogenous dependencies for the retrieved set of available versions, wherein the one or more acceptable versions are determined based on analyzing one or more dependency notations associated with the one or more packages and determining one or more final versions to be installed from the one or more acceptable versions of the one or more packages, from the analyzed one or more dependency notations;
generate one or more dependency graphs for the one or more acceptable versions of the one or more packages, wherein generating the one or more dependency graphs comprises forming one or more product dependency graphs and one or more package dependency graphs to use one or more packages associated with at least one of the existing activity or the new activity;
perform unification of the one or more acceptable versions of the one or more packages based on the one or more dependency graphs, wherein a final unified version of the one or more packages is selected based on analyzing one or more primary ordinal directions and one or more subordinal directions of dependencies associated with the one or more acceptable versions of the one or more packages;
determine one or more policies and claim requirements for the one or more policies associated with the final unified version of the one or more packages, upon performing unification of the one or more acceptable versions of the one or more packages, wherein the unification of the one or more acceptable versions of the one or more packages is not affected by deficiencies in the one or more policies;
activate one or more packages in the final unified version, when a claim grant for the one or more policies is obtained;
determine, by the processor, rights deficiency for the final unified version to validate licensing requirements associated with the final unified version based on a pre-stored licensing rules;
generate a set of recommendations to acquire required licenses for the one or more packages, when the validated licensing requirements associated with the final unified version is not satisfied;
wherein when performing the unification of the one or more acceptable versions of the one or more packages, if the unification is not successful due to multiple dependency requirements, then the unification results in unification error or the one or more acceptable versions of the one or more packages are installed side by side into a cache to install the final unified version of the one or more packages from the cache into an installation target location, based on acquiring the required licenses; and
install the final unified version of the one or more packages into the installation target location which is independent of other installation target locations, based on acquiring the required licenses, wherein each of the installation target locations are independent with respect to one or more packages installed into the each of the installation target locations.

* * * * *